(12) United States Patent
Shimomura et al.

(10) Patent No.: US 8,199,778 B2
(45) Date of Patent: Jun. 12, 2012

(54) RADIO COMMUNICATION SYSTEM, BASE STATION AND RANDOM ACCESS CHANNEL TRANSMISSION METHOD THEREOF

(75) Inventors: Tsuyoshi Shimomura, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 473 days.

(21) Appl. No.: 12/489,660

(22) Filed: Jun. 23, 2009

(65) Prior Publication Data

US 2009/0305693 A1 Dec. 10, 2009

Related U.S. Application Data

(63) Continuation of application No. PCT/JP2006/326211, filed on Dec. 28, 2006.

(51) Int. Cl.
*H04J 1/16* (2006.01)
*H04B 3/10* (2006.01)
*H04W 4/00* (2009.01)

(52) U.S. Cl. ......... 370/491; 370/328; 370/338; 370/500

(58) Field of Classification Search .................. 370/236, 370/310, 310.2, 328, 338, 491, 500; 455/422.1
See application file for complete search history.

(56) References Cited

U.S. PATENT DOCUMENTS

| | | | |
|---|---|---|---|
| 6,307,844 B1 | 10/2001 | Tsunehara et al. | |
| 6,944,454 B1 * | 9/2005 | Lee et al. | 455/443 |
| 7,715,347 B2 * | 5/2010 | Yoon et al. | 370/332 |
| 8,134,997 B2 * | 3/2012 | Nakagawa et al. | 370/350 |
| 2008/0101306 A1 * | 5/2008 | Bertrand et al. | 370/336 |
| 2008/0192678 A1 * | 8/2008 | Bertrand et al. | 370/328 |
| 2008/0299984 A1 * | 12/2008 | Shimomura et al. | 455/446 |
| 2009/0225701 A1 * | 9/2009 | Kwon et al. | 370/328 |
| 2009/0252112 A1 * | 10/2009 | Shimomura et al. | 370/330 |
| 2010/0278114 A1 * | 11/2010 | Kwon et al. | 370/328 |

FOREIGN PATENT DOCUMENTS

| | | |
|---|---|---|
| JP | 10-173594 | 6/1998 |
| JP | 2001-326596 | 11/2001 |

OTHER PUBLICATIONS

International Search Report and Written Opinion of International Application No. PCT/JP2006/326211, dated Mar. 5, 2007.
Ericsson; "E-UTRA Scalability of Random Access Preamble"; Agenda Item: 11.1.2; Document for: Discussion and Decision; TSG-RAN WG1 #45; R1-061367; Shanghai, China, May 8-12, 2006.
Branislav M. Popovic; "Generalized Chirp-Like Polyphase Sequences with Optimum Correlation Properties"; IEEE Transactions on Information Theory vol. 38, No. 4, Jul. 1992; pp. 1406-1409.

(Continued)

*Primary Examiner* — Warner Wong
(74) *Attorney, Agent, or Firm* — Myers Wolin, LLC

(57) ABSTRACT

A random access channel transmission method in which a user terminal selects a preamble pattern from among a plurality of known preamble patterns and transmits that preamble pattern to a base station, where that transmission method comprises: a step of dividing a cell into a plurality of areas, and setting one or more preamble patterns and the number of repetitions for transmitting the preamble pattern for each area; and a step wherein a user terminal that exists in an are close to the base station transmits a specified preamble pattern one time, and a user terminal that exists in an area far from the base station transmits another specified preamble pattern a plurality of times.

18 Claims, 17 Drawing Sheets

OTHER PUBLICATIONS

Ericsson; "E-UTRA Scalability of Random Access Preamble with cyclic prefix"; Agenda Item: 4.1; Document for: Discussion and Decision; TSG-RAN WG1 LTE Ad-Hoc; R1-061870; Cannes, France, Jun. 27-30, 2006.

Notice of Preliminary Rejection issued by the Korean Intellectual Property Office for corresponding Korean Patent Application No. 10-2009-7010029, mailed Dec. 22, 2010. [English translation attached.].

3GPP TSG RAN1 LTE WG1 Meeting #46, Tallinn, Estonia, Agenda Item 8.3.1, entitled "RACH Sequence Extension Methods for Large Cell Deployment", Aug. 28-Sep. 1, 2006. [Ref.: KOA mailed Dec. 22, 2010].

* cited by examiner

| r | PATTERN | |
|---|---|---|
| 0 | C(1), C(2), — — — — — | C(20) |
| 1 | C(21), C(22), — — — — — — | C(40) |
| 2 | C(41), C(42), — — — — — — | C(64) |

(B)

$P(k, L, i, s, r)$

| r | k | L | s | k | L | s | ... |
|---|---|---|---|---|---|---|---|
| 0 | $k_{01}$ | $L_{01}$ | $ixs_0$ | $k_{02}$ | $L_{02}$ | $ixs_0$ | |
| 1 | $k_{11}$ | $L_{11}$ | $jxs_1$ | $k_{12}$ | $L_{12}$ | $jxs_1$ | |
| 2 | $k_{21}$ | $L_{21}$ | $mxs_2$ | $k_{22}$ | $L_{22}$ | $mxs_2$ | |

(C)

| r | k | L | s | k | L | s | |
|---|---|---|---|---|---|---|---|
| 0 | 30 | 37 | [L/I] | | | | |
| 1 | 1 | 37 | [L/J] | | | | |
| 2 | | | | | | | |

FIG. 18 PRIOR ART
(A)
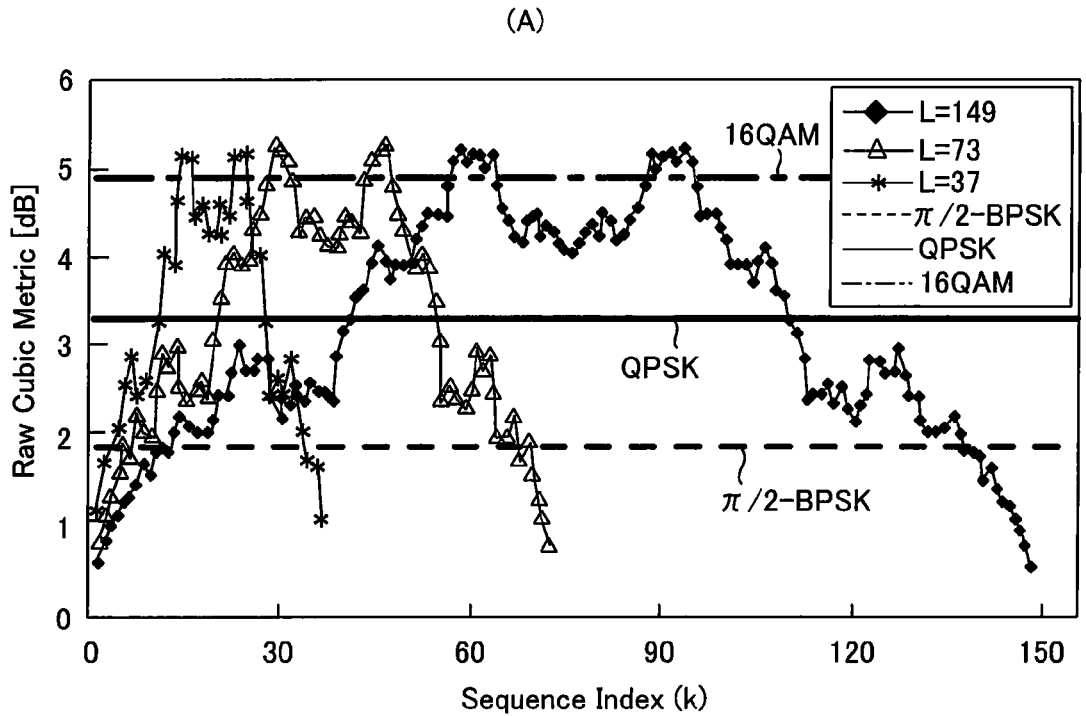
(B)
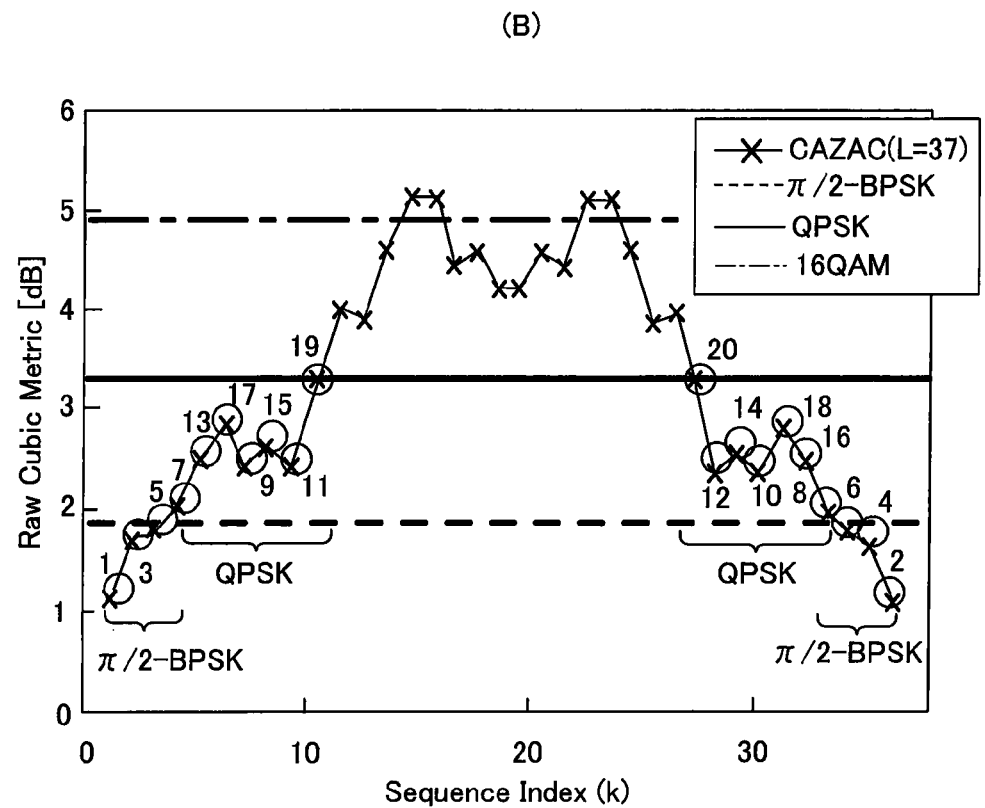

RADIO COMMUNICATION SYSTEM, BASE STATION AND RANDOM ACCESS CHANNEL TRANSMISSION METHOD THEREOF

CROSS REFERENCE TO RELATED APPLICATION

This is a continuation Application of PCT/JP2006/326211, which was filed on Dec. 28, 2006, now pending, the contents of which are herein wholly incorporated by reference.

BACKGROUND OF THE INVENTION

The present invention relates to a radio communication system, base station and random access channel transmission method thereof, and more particularly, to a radio communication system, base station and random access channel transmission method thereof in which a user terminal selects a preamble pattern from among a plurality of known preamble patterns and transmits that preamble pattern to the base station.

In a cellular system such as a 3GPP system, a user terminal performs a cell search immediately after the power is turned ON or immediately after a handover, and after that cell search is completed, uses a random access channel RACH to perform initial communication with a base station. The base station periodically uses a broadcast channel to broadcast a plurality of preamble patterns for initial communication used in a cell, so the user selects an appropriate preamble pattern from among the plurality of preamble patterns included in the received broadcast information, and transmits that preamble pattern to the base station. In this case, the number of preamble patterns is set so that the probability that the same preamble will be transmitted at the same time from a plurality of users is sufficiently small. The base station performs correlation processing between received signals and all of the preamble patterns that could be transmitted, determines whether or not a preamble pattern has been transmitted by whether or not a correlation peak that is equal to or greater than a set value has been detected, and sends a response. The user terminal repeatedly performs transmission a set number of times until the preamble reaches and is received by the base station, and when it is confirmed that the preamble has arrived at the base station, the user terminal transmits a message such as a terminal number, data type, data amount or the like to the base station and establishes a communication link with the base station. When the preamble does not arrive at the base station even after being transmitted the set number of times, the user terminal terminates transmission of the preamble.

The probability that a preamble will be detected by the base station depends on the reception power and the preamble length. In the next generation 3GPP system (3GPP LTE), a user terminal estimates the propagation loss of a downlink signal from the base station and determines the transmission power for first transmission of the preamble according to the amount of that loss. As a result, the reception power at the base station of a signal from the edge of a cell becomes nearly the same as that of a signal from the center of the cell, and the detection probability is nearly the same.

However, a 3GPP LTE system is capable of handling cell sizes having a radius up to at least 100 km, and there is a large difference between the maximum propagation loss of a small cell and large cell. On the other hand, the maximum transmission power is the same for all user terminals regardless of whether the cell is a small cell or large cell. Therefore, a problem occurs in that for preambles having the same preamble length, the detection probability differs depending on the size of the cell.

To solve this problem, a method of changing the length of a preamble according to the size of the cell has been proposed (see TSG-RAN WG1 #45, R1-061367). More specifically, the length of a preamble is changed by changing the number of times 'n' that a unit sequence C(x) of a preamble is repeated based on the cell size as shown in FIG. 17. At the same time, the size of 1 RACH slot is also changed to a unit access slot×(n+1). TG1 is the Guard Time that is provided in a RACH so that the preamble does not receive any effects from the previous channel, and TG2 is a Guard Time that is provided in a RACH so that there is no effect on the next channel. During reception, in order to make it easier to perform the necessary correlation computation using frequency domain processing, it is possible to attach a Cyclic Prefix instead of providing the guard time TG1 (see TG-RAN WG1 LTE Ad-Hoc, R1-061870). This Cyclic Prefix itself is a repetition of part of the unit sequence.

Also, in a 3GPP LTE system, use of a CAZAC (Constant Amplitude Zero Auto-Correlation) sequence as the unit sequence of a preamble pattern has been considered. As the name implies, a CAZAC sequence has an ideal auto correlation property, so a pair of sequences having the same sequence number but different cyclic shift intervals are orthogonal to each other. A preamble pattern that uses a CAZAC sequence can be defined as P(k, s, r), which is a function of the sequence number k, cyclic shift interval s and number of repetitions r. In order to be able to use a CAZAC sequence having the same sequence number as the preamble patterns for different users by changing the cyclic shift interval, it is essential that the cyclic shift interval s is greater than the difference in arrival times at the base station of the preambles transmitted from each user. In the case that the number of preamble patterns that are possible by cyclic shifting is not enough, sequences with a different sequence number are used.

A Zadoff-Chu sequence, which is a typical CAZAC sequence, is expressed by Equation (1) (see B. M. Popovic, "Generalized Chirp-Like Polyphase Sequences with Optimum Correlation Properties", IEEE Trans. Infor. Theory, Vol. 38, pp. 1406-1409, July 1992).

$$ZC_k(n) = \exp\{-j2\pi k/L \cdot (qn + n(n+L\%2)/2)\} \quad (1)$$

Here, L and k are both prime values and represent the sequence length and sequence number, respectively. Also, n is the symbol number (0, 1, ..., L−1), q is an arbitrary integer, and L %2 is the remainder after dividing L by 2 and may be also be written as Lmod(2). When L is a prime number, the number of CAZAC sequences M becomes (L−1). Therefore, when L=149, the number of CAZAC sequences M is 148, and when L=73, M=72, and when L=37, M=36. The sequence that is obtained by cyclically shifting $ZC_k(n)$ by just s can be expressed as $ZC_k(n+s)$. For CAZAC sequences, the Peak to Average Power Ratio PAPR characteristic changes greatly according to the sequence number. In (A) of FIG. 18, a Raw Cubic Metric (an evaluation index nearly equivalent to PAPR) for L=149, 73, 37 is shown, and (B) of FIG. 18 shows the Raw Cubic Metric for the case in which L=37. In the figure, the Raw Cubic Metrics for the data modulation methods (BPSK, QPSK and 16QAM) are shown for a comparison. Also, in (B) of FIG. 18, the Raw Cubic Metrics are shown in order of the smallest with sequence numbers assigned starting from No. 1.

In TSG-RAN WG1 #45, R1-061367 and TSG-RAN WG1 LTE Ad-Hoc, R1-061870 (R1-061367, R1-061870), the preamble pattern for a cell is designed based on the number of times it is necessary to repeat transmission from a user at the edge of a cell and the cyclic shift interval. Therefore, the preamble patterns that are used by user terminals at the edge of a cell and in the center of a cell are the same, and only the transmission power changes according to the location of the user terminal. However, in this method for designing a preamble pattern, the following problems occur.

In other words, the number of repetitions of the preamble pattern is greater for a large cell than a small cell, so the overall size of the preamble becomes longer, and a problem occurs in that the processing load become large on the receiving side (base station). Also, it is necessary to set the cyclic shift interval s so that it is longer than the maximum delay time from the users at the edge of the cell. In order to accomplish this, the cyclic shift interval must be made to be large in large cells, however a problem occurs in that the number of sequences (number of preamble patterns) that can be taken through cyclic shifting from a primary sequence having little mutual interference decreases, thus another primary sequence having large mutual interference must be used.

SUMMARY OF THE INVENTION

Therefore, the object of the present invention is to reduce the processing load on the base station even in the case of a large cell.

Another object of the present invention is to increase the number of usable preamble patterns that can be taken from a primary sequence such as a CAZAC sequence having little mutual interference even in the case of a large cell.

Moreover, another object of the present invention is to prevent non-linear distortion of signals that are outputted from a transmission amplifier of a user terminal that is located at the edge of a cell, and to improve the efficiency of the amplifier.

Furthermore, another object of the present invention is to make it possible for user terminals to simultaneously use the same preamble pattern by not letting the transmission timing of that preamble pattern overlap in the case of a preamble pattern having a small number of repetitions, for example, in the case of a preamble pattern having '0' repetitions.

Yet another object of the present invention is to make a preamble pattern that is retransmitted from a user terminal arrive at the base station securely by selecting the preamble pattern having a larger number of repetitions.

Moreover, another object of the present invention is to, when using a preamble pattern having more than one repetition, make the transmission frequency of the first preamble, the transmission frequency of the second preamble, and so on different in order to increase the reception power of the preamble by the frequency diversity effect and make certain that the preamble arrives at the base station.

Random Access Channel Transmission Method

A first form of the present invention is a random access channel transmission method in which a user terminal selects a preamble pattern from among a plurality of known preamble patterns, and transmits that preamble pattern to a base station. In this random access channel transmission method a user terminal that exists in an area close to the base station repeats a first preamble pattern M number of times and transmits the preamble generated by the repetition, and a user terminal that exists in an area far from the base station repeats a second preamble pattern N (M<N) number of times and transmits the preamble generated by the repetition.

In this transmission method, the base station sets said known preamble patterns for each area using CAZAC sequences, and a CAZAC sequence is used as a plurality of preamble patterns by changing the cyclic shift interval of the CAZAC sequence by each of a plurality of user terminals.

In this transmission method, the cyclic shift interval of a CAZAC sequence which is used in an area where the number of repetitions is small, is made to be narrow, and the cyclic shift interval of a CAZAC sequence which is used in an area where the number of repetitions is large, is made to be wide. Also, in this transmission method, the base station sets a CAZAC sequence having a small peak to average power ratio (PAPR) as the CAZAC sequence for an area where the number of repetitions is large.

Base Station

A second form of the present invention is a base station of a radio communication system in which a user terminal selects one preamble pattern from among a plurality of known preamble patterns and transmits that preamble pattern to the base station, comprising: broadcast means for broadcasting to the user terminals, a plurality of preamble patterns and a number of repetitions for transmitting repeatedly each of the preamble patterns; preamble detection means for detecting a preamble pattern that is transmitted from a user terminal; and transmission means for creating and transmitting preamble reception confirmation information to the user terminal in a case where said preamble pattern is received.

The preamble detection means comprises: a correlation unit that calculates the correlation between the received signal and each of said broadcasted preamble patterns; an addition unit that adds for each preamble patterns, the correlation results a plurality of times that correspond to said number of repetitions for transmitting the preamble pattern; and a comparison unit that performs a comparison to determine whether the peak correlation value is equal to or greater than a set value for each preamble pattern, and when the peak correlation value is equal to or greater than the set value, determines that the preamble pattern that corresponds to that peak correlation value has been received.

Radio Communication System

A third form of the present invention is a radio communication system in which a user terminal selects a preamble pattern from among a plurality of known preamble patterns and transmits that preamble pattern to a base station. In this radio communication system the base station comprises: broadcast means for dividing a cell into a plurality of areas, setting one or more preamble patterns for each area and the number of repetitions for transmitting repeatedly each of the preamble patterns, and broadcasting the set information to user terminals; preamble detection means for detecting a preamble pattern that is transmitted from a user terminal; and transmission means for creating and transmitting preamble reception confirmation information to the user terminal when said preamble pattern is received; and the user terminal comprises: a memory unit that saves broadcast information that is transmitted from the base station; area detection means for detecting the area where that user terminal exists; a preamble pattern selection unit that selects a preamble pattern that corresponds to the area from the broadcast information stored in said memory unit; and a preamble transmission unit that generates the preamble pattern and transmits the preamble pattern repeatedly the number of repetitions.

The user terminal further comprises: receiving means for receiving the preamble reception confirmation information that is transmitted from the base station; reception confirmation means for determining, based on the preamble reception confirmation information, whether the preamble pattern that was transmitted by that user terminal was received by the base station; and means for increasing the number of repetitions for transmitting the preamble pattern when the base station did not receive the transmitted preamble pattern; wherein said preamble transmission unit continuously transmits the preamble pattern the increased number of repetitions for transmission.

When the time necessary for transmitting a preamble pattern one time is taken to be 1 access slot, and the maximum number of repetitions is taken to be M, said preamble transmission unit of a user terminal that exists in an area where the number of repetitions is '0' transmits the selected preamble pattern to the base station in a specified access slot from among (M+1) number of access slots.

In addition to the preamble patterns for each said area, and the number of repetitions, said broadcast means of the base station broadcasts a hopping pattern to user terminals using a broadcast channel, and said preamble transmission unit of a user terminal that exists in an area where the number of repetitions is '1' or more transmits the selected preamble pattern by changing the transmission frequency based on said hopping pattern.

BRIEF DESCRIPTION OF THE DRAWINGS

FIG. 5 is a drawing explaining the preamble pattern information that the base station broadcasts using a RACH channel to user terminals that are in a cell.

FIG. 18 is a drawing of the Raw Cubic Metric (evaluation index that is nearly equivalent to the PAPR) of a CAZAC sequence.

DESCRIPTION OF THE PREFERRED EMBODIMENTS (A) Overview of the Present Invention

Figure 1:
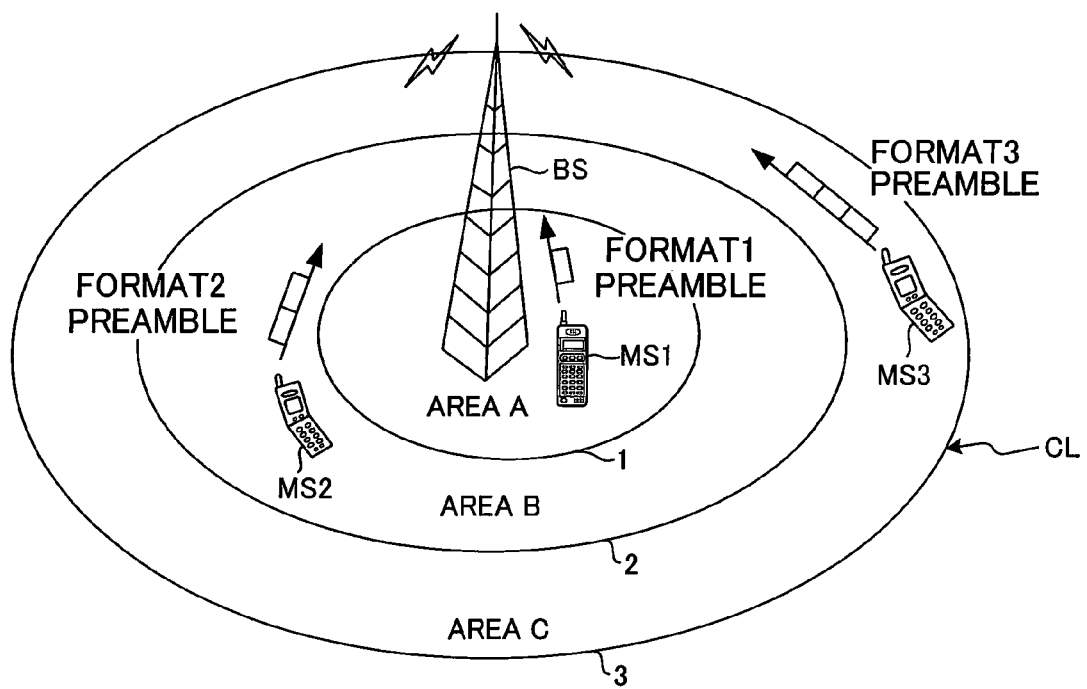
FIG. 1 is a drawing showing an overview of the present invention.

FIG. 1 is a drawing showing an overview of the present invention, and shows a base station BS, a cell CL that the base station BS covers, and user terminals (mobile stations) MS1 to MS3. The base station BS controls the transmission power for the preamble and number of repetitions of the preamble pattern according to the distance to the user terminal.

Figure 2:
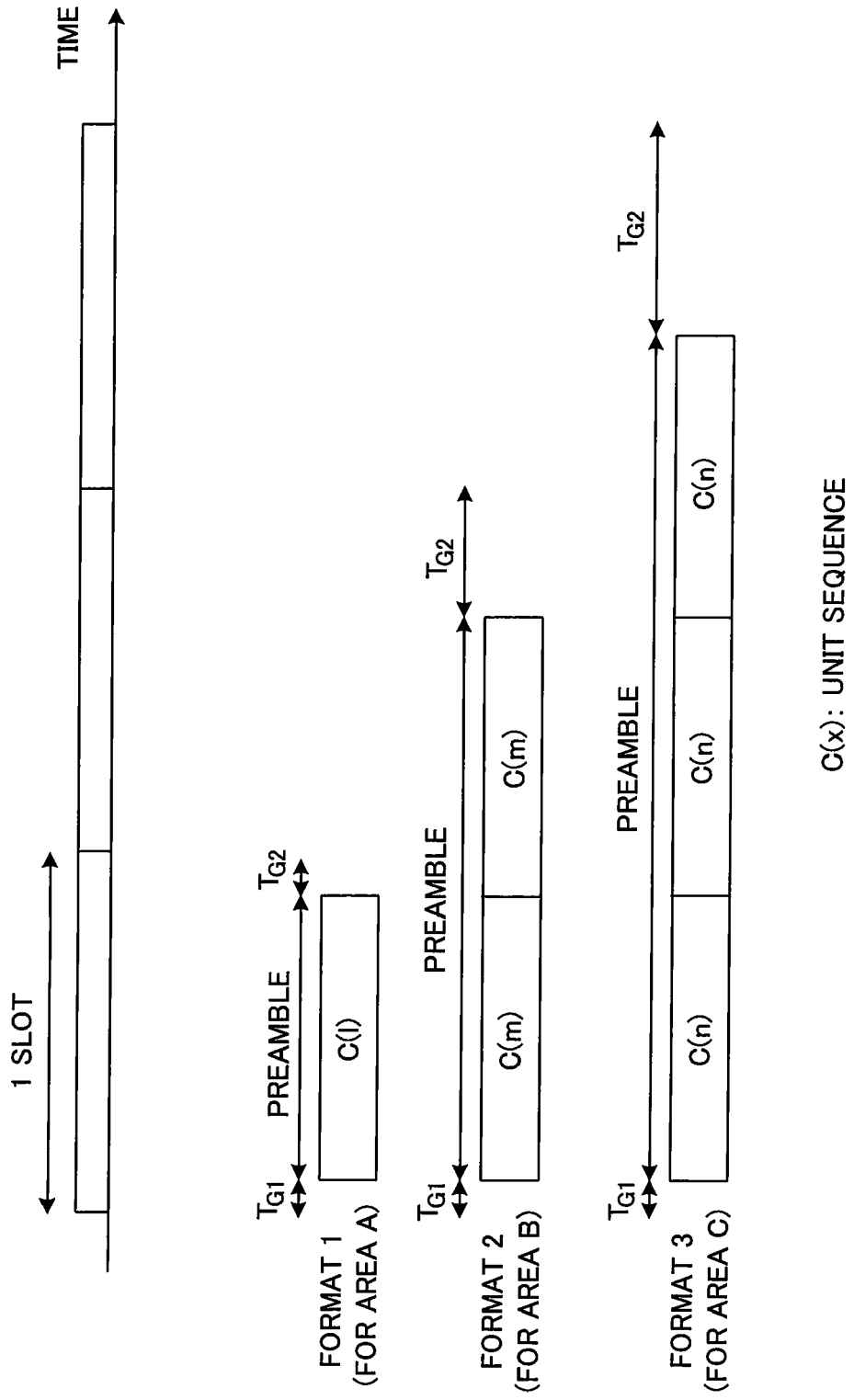
FIG. 2 is a drawing showing the relationship between the area and the number of repetitions of the preamble.

In FIG. 1 the cell CL is divided into an area 1 (area A) that is near the base station BS, an area 3 (area C) that is an area far from the base station BS and that includes the edge of the cell, and an area 2 (area B) that is between area A and area B. As shown in FIG. 2, the base station BS prepares a preamble pattern C(l) having format 1 as a preamble for area A with a number of repetitions of 0, prepares a preamble pattern C(m) having format 2 as a preamble for area B with a number of repetitions of 1, and a preamble pattern C(n) having format 3 as a preamble for area C with a number of repetitions of 2. In conformity with the number of repetitions (=n) the size of a RACH slot changes and it becomes equal to (unit access slot)×n, and guard times TG1 and TG2 are provided before and after the preamble, respectively.

Each of the preamble patterns C(l), C(m) and C(n) are CAZAC sequences, for example, and can be defined by P(k, s, r), which is a function of the sequence number k, cyclic shift interval s and number of repetitions r. By changing the cyclic shift interval, it is possible to use a CAZAC sequence as a plurality of preamble patterns having the same sequence number for different users. It is also possible to prepare two or more CAZAC sequences for each area A, B, C.

As described above, by making the number of repetitions of preamble patterns of areas that are near the base station BS 0 or 1, it is possible to make the size of the preamble of user terminals existing in an area near the base station BS short. As a result, the base station BS can perform receiving processing according to the number of repetitions, and thus receiving processing by the base station of preambles having a small number of repetitions becomes easy. Preferably, the number of repetitions of preamble patterns for the area that is the closest to the base station BS is taken to be 0.

A user terminal estimates its distance from the base station or the area in which it exists from the propagation loss of a Downlink signal. That is, the preamble pattern for each area and the value of the downlink signal transmission power are periodically broadcast from the base station BS within the cell, so the user terminal computes the difference between the actual downlink signal reception power and the broadcast value for the downlink signal transmission power (propagation loss), then from that propagation loss determines the area in which it exists, and together with selecting a preamble pattern for transmission based on that area, recognizes the number of repetitions for transmission 'n', and repeatedly transmits that preamble pattern 'n' times.

In other words, by broadcasting information such as a plurality of preamble patterns and the number of repetitions corresponding to each preamble pattern, the base station BS controls the preamble pattern selected by the user terminal and the number of repetitions.

By storing the information of the number of repetitions corresponding to the preamble pattern in the memory of the user terminal beforehand, it is possible to eliminate the need for the base station BS to broadcast that information. Thereby, the user terminal acquires information about the preamble patterns from broadcast information from the base station BS, then according to the stored contents, identifies the number of repetitions for each preamble pattern, and when the user terminal is near the base station BS, the user terminal selects and uses a preamble pattern that has a small number of repetitions.

In an area whose propagation loss is less than a preset threshold value, or in other words, in an area that is close to the base station, the difference between arrival delay times for the preambles from each user terminal to the base station is small, so it is possible to make the cyclic shift interval small. By making the cyclic shift interval small, it is possible to increase the number of preamble patterns that can be taken from the primary sequence of the same CAZAC sequence by performing cyclic shifting, so even when a plurality of preamble patterns are transmitted simultaneously from a plurality of user terminals, the average mutual interference is small, so the detection probability is improved.

(B) First Embodiment (a) Example of a Preamble Pattern

Figure 3:
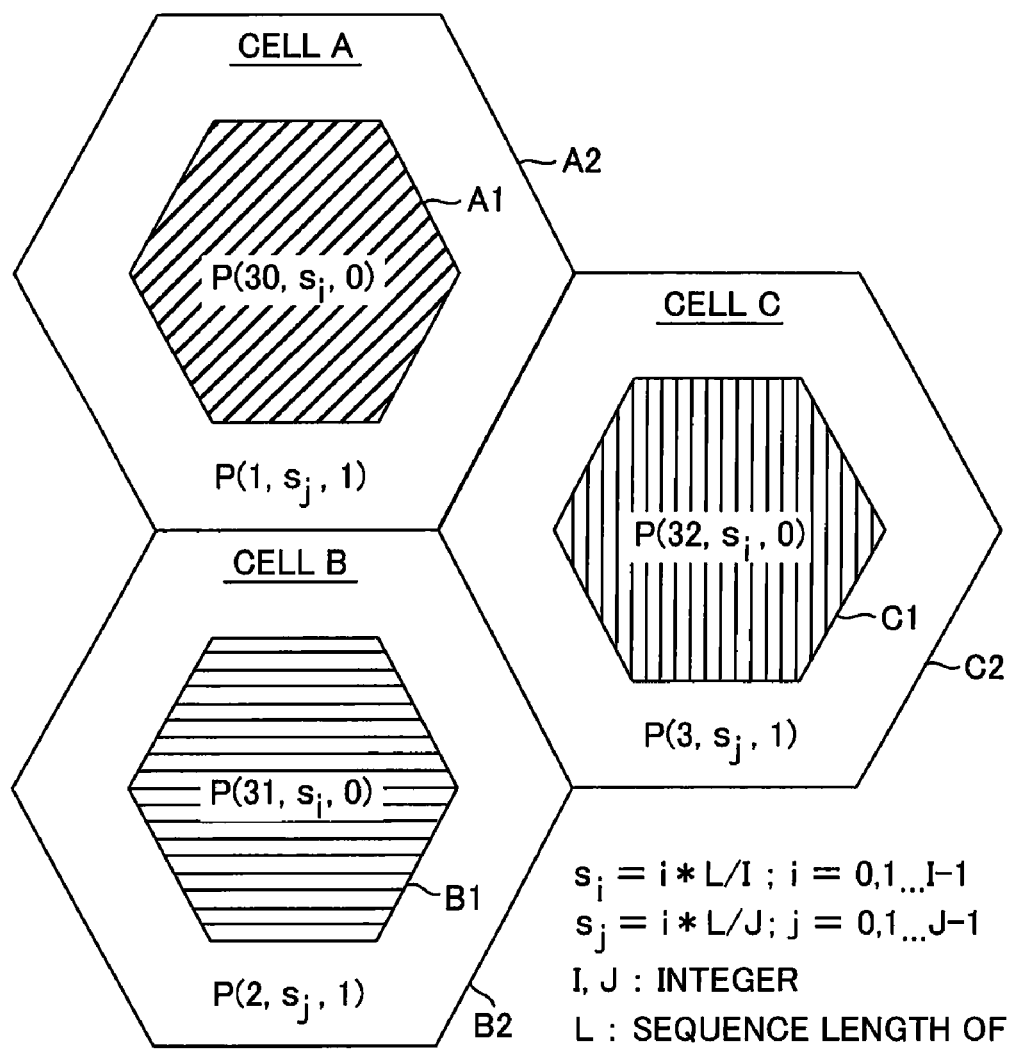
FIG. 3. is a drawing showing examples of preamble patterns that are assigned to each area for the case in which three adjacent cells are each divided into two areas.

FIG. 3 is a drawing showing examples of preamble patterns that are assigned to each area for the case in which three adjacent cells are each divided into two areas. Here, a CAZAC sequence is applied as the primary sequence of the preamble pattern, and in a case where a number of repetitions r is defined for an arbitrary combination of sequence number k and cyclic shift amount s, the preamble pattern is expressed as P(k, s, r).

The preamble patterns in areas A1 to C1 that are near the center (base station) of the cells A to C are P(30, si, 0), P(31, si, 0) and P(32, si, 0). In other words, the number of repetitions of a preamble pattern in areas A1 to C1 is '0', the sequence numbers of the CAZAC sequences that are used in that case are 30, 31 and 32, and the cyclic shift amount is si. By taking the sequence length of the CAZAC sequences to be L, it is possible to take out and use [L/si] number of preamble patterns from a primary sequence having sequence numbers 30, 31 and 32 in areas A1 to C1, and the ratio of the types of number of repetitions for each area (=1) and the number of preamble patterns that can be used (=[L/si]) is 1:[L/si]. However, [L/si] is the smallest integer greater than L/si. By taking I=[L/si], then $si = i \times [L/I]$ $i = 0, 1, \ldots, I-1$.

The preamble patterns in areas A2 to C2 that are far from the center (base station) of the cells A to C are P(1, sj, 1), P(2, sj, 1) and P(3, sj, 1). In other words, in areas A2 to C2, the number of repetitions of the preamble patterns is 1, the sequence numbers of the CAZAC sequences that are used in that case are 1, 2 and 3, and the cyclic shift amount is sj. When the sequence length of the CAZAC sequences is taken to be L, it is possible to take out and use [L/sj] number of preamble patterns from a primary sequence having sequence numbers 1, 2 and 3 in areas A2 to C2, and the ratio of the types of number of repetitions for each area (=1) and the number of preamble patterns that can be used (=[L/sj]) is 1:[L/si]. By taking J=[L/sj], then $sj = j \times [L/J]$ $j = 0, 1, \ldots, J-1$.

As described above, by taking the number of repetitions of preamble patterns of areas near the base station to be '0', it is possible to shorten the preamble size of user terminals that exist in areas near the base station. As a result, the base station BS is able to perform receiving processing according to the number of repetitions, and it become easy for the base station to perform receiving processing of preambles having a small number of repetitions.

Controlling the Cyclic Shift Interval in an Area

In areas A1 to C1 that are near the base station, the differences in the delay times when the preambles arrive at the base station from each of the user terminals are small, so the cyclic shift interval can be small, and thus a large number of preamble patterns can be taken out from the same primary sequence through cyclic shifting. As a result, the average mutual interference is decreased and the detection probability is improved even when a plurality of preambles are transmitted simultaneously from a plurality of user terminals.

Assigning CAZAC Sequences in Consideration of the PAPR

The PAPR (Peak to Average Power Ratio) characteristic also differs according to the sequence number (see FIG. 18), so CAZAC sequences having a small PAPR are assigned to preamble patterns that are transmitted by increasing the transmission power. Since the transmission power increases the farther the user terminal is away from the base station, CAZAC sequences having a small PAPR are assigned to preamble patterns having a large number of repetitions. In this way, it is possible to improve the detection characteristics for preamble patterns from users at the edge of a cell. In FIG. 3, CAZAC sequences having sequence numbers 1, 2 and 3 and a small PAPR are assigned as preamble patterns having a repetition number of 1.

Identifying the Area Where a User Terminal Exists

Together with the preamble patterns that can be used in each cell, the value of the downlink transmission power is also periodically broadcast within the cell from the base station. A user terminal compares the actual reception power Pr of a downlink signal with the transmission power, and when the difference is small, the user terminal determines that it is in an area A1 to C1 that is near the base station, and selects a preamble pattern having a repetition number of '0', otherwise, the user terminal selects and transmits a preamble pattern having a repetition number of '1'.

Construction is also possible in which a reference downlink signal reception power value THa is received from the base station, and the user terminal compares the actual downlink signal reception power Pr with that reference downlink signal reception power value THa, and when Pr>THa, the user terminal determines that it is in an area A1 to C1 that is near the base station and selects a preamble pattern having a repetition number of '0', otherwise, the user terminal selects and transmits a preamble pattern having a repetition number of '1'.

(b) Base Station

Figure 4:
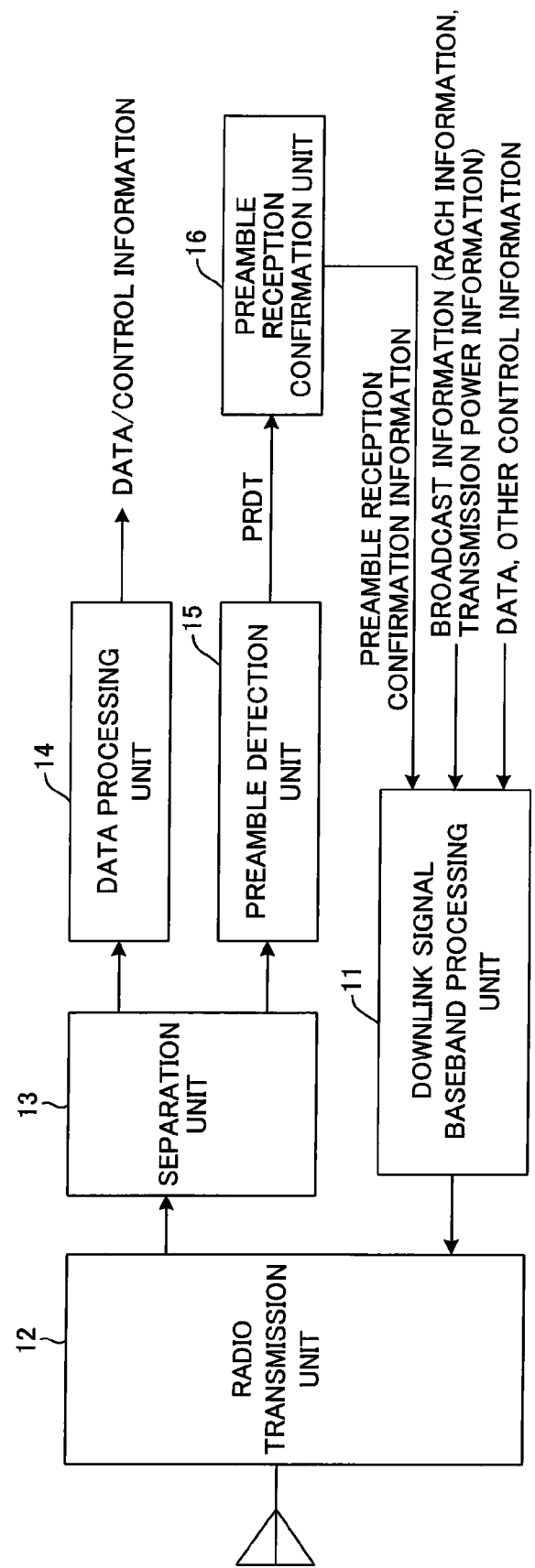
FIG. 4 is a drawing showing the construction of a base station.

FIG. 4 is a drawing showing the construction of a base station. A downlink signal baseband processing unit 11 periodically broadcasts broadcast information using a broadcast channel via a radio transmission unit 12 to user terminals within a cell, and transmits data/control information to the user terminals using a data channel. The broadcast information includes (1) RACH information (preamble pattern, preamble transmission period, etc.) that is necessary for performing initial communication with the base station immediately after the power to the user terminal is turned ON or immediately after a handover, and (2) transmission power information of the base station. It is preferable that the RACH information includes information about the number of repetitions corresponding to the preamble pattern.

The radio transmission unit 12 converts a radio signal received from a user terminal to a baseband signal, a separation unit 13 separates the received signal into reception data during communication and a preamble signal during initial communication, and inputs that data to a data processing unit 14 and a preamble detection unit 15. The data processing unit 14 performs a decoding process on the signal transmitted from the user terminal and outputs the obtained data/control information. The preamble detection unit 15 performs a correlation operation to compute the correlation between the received preamble signal and each known preamble signal to detect the preamble transmitted by the user terminal, and notifies a preamble reception confirmation unit 16 of the detection results. The preamble reception confirmation unit 16 creates preamble reception confirmation information that includes data that identifies the detected preamble, and transmits that reception confirmation information via the downlink signal baseband conversion unit 11 and radio transmission unit 12.

FIG. 5 is a drawing explaining the preamble pattern information that the base station broadcasts by a RACH channel to user terminals within a cell, and is for the case when a cell is divided into three areas A, B and C as shown in FIG. 1. Presuming that a total of 64 preamble patterns are broadcast within a cell, 20 preamble patterns C(1) to C(20) having a repetition number r=0 are broadcast for cell A, 20 preamble patterns, C(21) to C(40) having a repetition number r=1 are broadcast for cell B, and 24 preamble patterns C(41) to C(64) having a repetition number r=2 are broadcast for cell C.

More specifically, the broadcast of preamble patterns is as described below. A preamble pattern is expressed as P(k, L, s, r), which is a function of the sequence number k of the CAZAC sequence, the sequence length L, the cyclic shift interval s and the number of repetitions r, and the 64 preambles described above are identified by the 64 kinds of combinations of k, L, s and r. (B) of FIG. 5 is a drawing explaining the method of broadcasting preamble patterns in this case, where the preamble patterns $P(k_{01}, L_{01}, i \times s_0, 0)$ and $P(k_{02}, L_{02}, i \times s_o, 0)$, having a repetition number r=0, are respectively broadcast by the following.

$k_{01}, L_{01}, i \times s_0, 0 \; i=0, 1, \ldots, I_1-1 \; I_1=[L_{01}/s_0]$ $k_{02}, L_{02}, i \times s_0, 0 \; i=0, 1, \ldots, I_2-1 \; I_2=[L_{02}/s_0]$ Moreover, the preamble patterns $P(k_{11}, L_{11}, j \times s_1, 1)$ and $P(k_{12}, L_{12}, j \times S_1, 1)$, having a repetition number r=1, are respectively broadcast by the following.

$k_{11}, L_{11}, j \times s_1, 1 \; j=0, 1, \ldots, J_1-1 \; J_1=[L_{11}/s_1]$ $k_{12}, L_{12}, j \times s_1, 1 \; j=0, 1, \ldots, J_2-1 \; J_2=[L_{12}/s_1]$ Furthermore, the preamble patterns $P(k_{21}, L_{21}, m \times s_2, 2)$ and $P(k_{22}, L_{22}, m \times s_2, 2)$, having a repetition number r=2, are respectively broadcast by the following.

Figure 6:
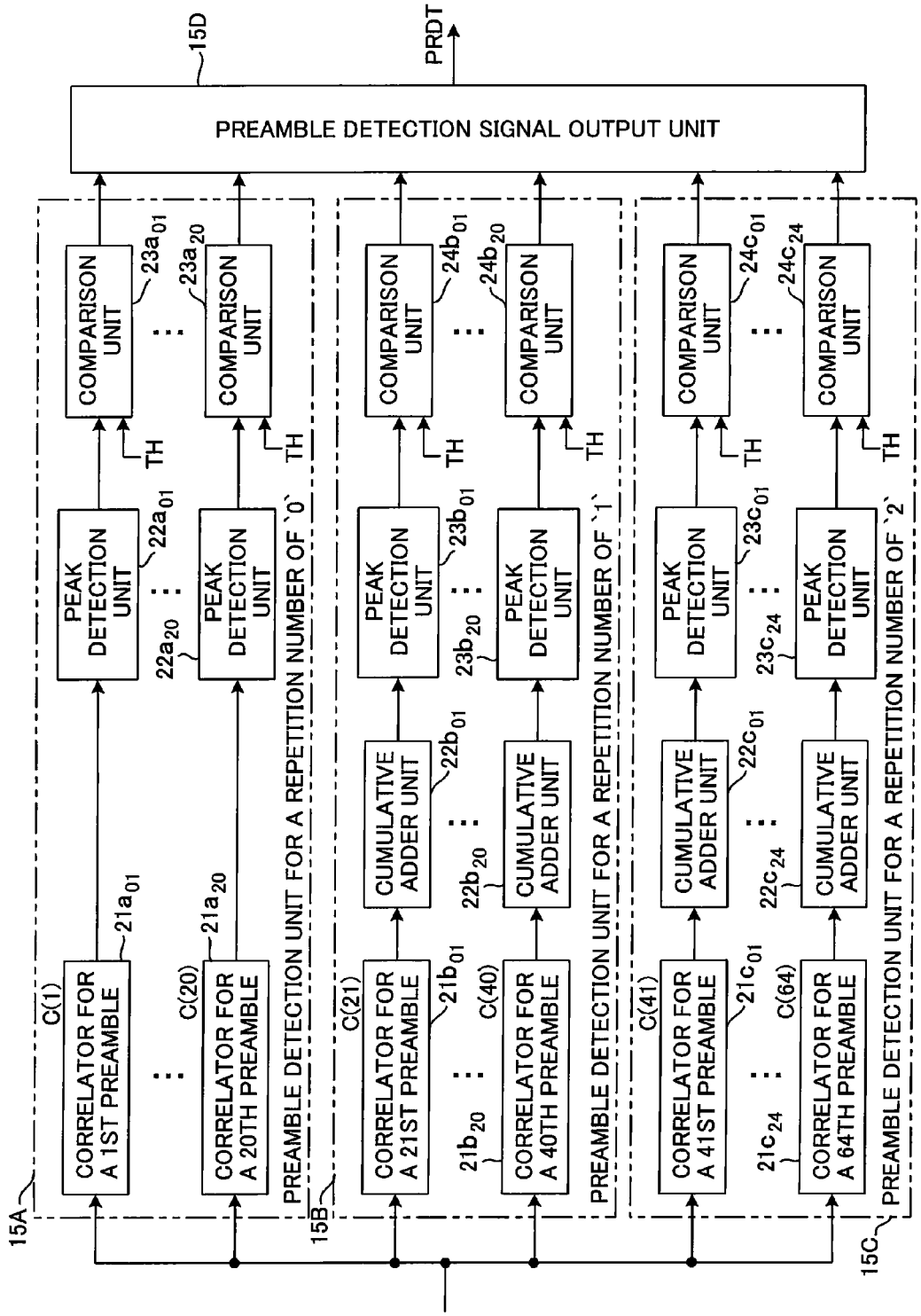
FIG. 6 is a drawing showing the construction of a preamble detection unit.

$k_{21}, L_{21}, m \times s_2, 2 \; m=0, 1, \ldots, M_1-1 \; M_1=[L_{21}/s_2]$ $k_{22}, L_{22}, m \times s_2, 2 \; m=0, 1, \ldots, M_2-1 \; M_2=[L_{22}/s_2]$ In (B) of FIG. 5, the case in which two CAZAC sequences having repetition numbers r=0, 1 and 2 are broadcast is shown, however, it is also possible to broadcast one CAZAC sequence or to broadcast 3 or more CAZAC sequences. (C) of FIG. 5 is a drawing explaining the method of broadcasting the preamble patterns of cell A shown in FIG. 3, and is for the case in which CAZAC sequences having a sequence length L=37 (see (B) of FIG. 18) are used. A preamble pattern P(30, 37, i×[L/I], 0), having a repetition number r=0, is broadcast by $30, 37, i \times [L/I], 0 \; i=0, 1, \ldots, I-1,$ and a preamble pattern P(1, 37, j×[L/J], 1), having a repetition number r=1, is broadcast by $1, 37, j \times [L/I], 1 \; j=0, 1, \ldots, J-1.$ FIG. 6 is a drawing showing the construction of a preamble detection unit 15, and is an example of construction for the case in which 20 preamble patterns C(1) to C(20) having a repetition number r=0 are broadcast for cell A, 20 preamble patterns, C(21) to C(40) having a repetition number r=1 are broadcast for cell B, and 24 preamble patterns C(41) to C(64) having a repetition number r=2 are broadcast for cell C. A first preamble unit 15A for a repetition number of '0', a second preamble unit 15B for a repetition number of '1', a third preamble unit 15C for a repetition number of '2 and a preamble detection signal output unit 15D are provided in the preamble detection unit 15. The first preamble unit 15A for a repetition number of '0' comprises: correlators $21a_{01}$ to $21a_{20}$ that perform a correlation operation to compute the correlation between a received preamble signal and preamble patterns C(1) to C(20) having a repetition number r=0; peak detection units $22a_{01}$ to $22a_{20}$ that detect the peak of the output from each of the correlators; and comparison units $23a_{01}$ to $23a_{20}$ that compare and output whether or not each of the detected peak values is equal to or greater than a set value TH. When the peak value from the output of a correlator of a preamble pattern C(i) (i=1 to 20) is equal to or greater than the preset value TH, the preamble detection signal output unit 15D determines that the preamble pattern C(i) has been transmitted from a user terminal, and inputs a preamble detection signal PRDT indicating that to the preamble reception confirmation unit 16 (see FIG. 4).

The second preamble unit 15B for a repetition number of '1' comprises: correlators $21b_{01}$ to $21b_{20}$ that perform a correlation operation to compute the correlation between a received preamble signal and preamble patterns C(21) to C(40) having a repetition number r=1; cumulative adder units $22b_{01}$ to $22b_{20}$ that cumulatively add the results from the correlation units 2 times; peak detection units $23b_{01}$ to $23b_{20}$ that detect the peak output values from each of the cumulative adders; and comparison units $24a_{01}$ to $24a_{20}$ that compare and output whether or not each of the detected peak values is equal to or greater than a set value TH. When the peak value from the output of a cumulative adder of a preamble pattern C(j) (j==21 to 40) is equal to or greater than the preset value TH, the preamble detection signal output unit 15D determines that the preamble pattern C(j) has been transmitted from a user terminal, and inputs a preamble detection signal indicating that to the preamble reception confirmation unit 16.

The third preamble unit 15C for a repetition number of '2' comprises: correlators $21c_{01}$ to $21c_{24}$ that perform a correlation operation to compute the correlation between a received preamble signal and preamble patterns C(41) to C(64) having a repetition number r=2; cumulative adder units $22c_{01}$ to $22c_{24}$ that cumulatively add the results from the correlation units 3 times; peak detection units $23c_{01}$ to $23C_{24}$ that detect the peak output from each of the cumulative adders; and comparison units $24c_{01}$ to $24C_{24}$ that compare and output whether or not each of the detected peak values is equal to or greater than a set value TH. When the peak value from the output of a cumulative adder of a preamble pattern C(m) (m=41 to 64) is equal to or greater than the preset value TH, the preamble detection signal output unit 15D determines that the preamble pattern C(m) has been transmitted from a user terminal, and inputs a preamble detection signal indicating that to the preamble reception confirmation unit 16.

(c) User Terminal (Mobile Station)

Figure 7:
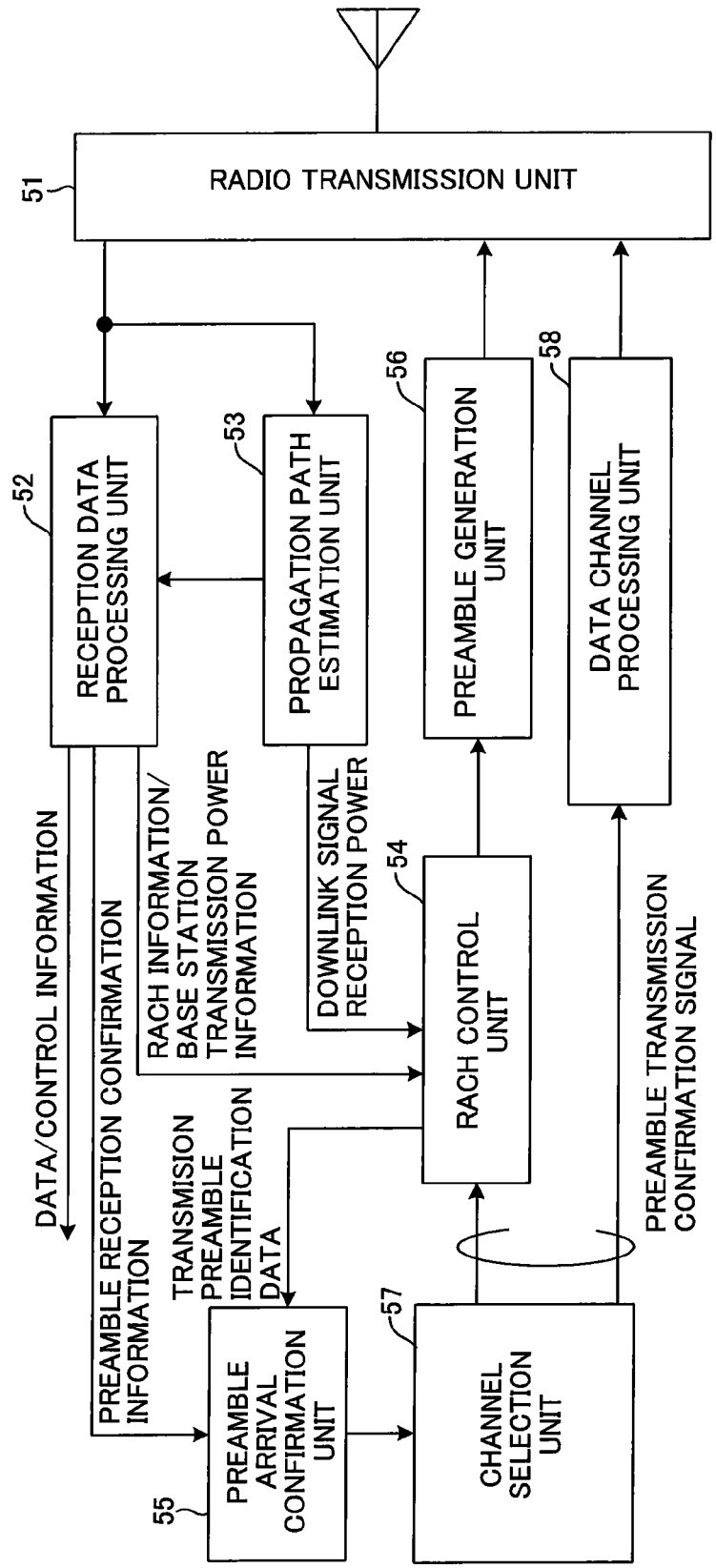
FIG. 7 is a drawing showing the construction of a user terminal (mobile station).
Figure 8:
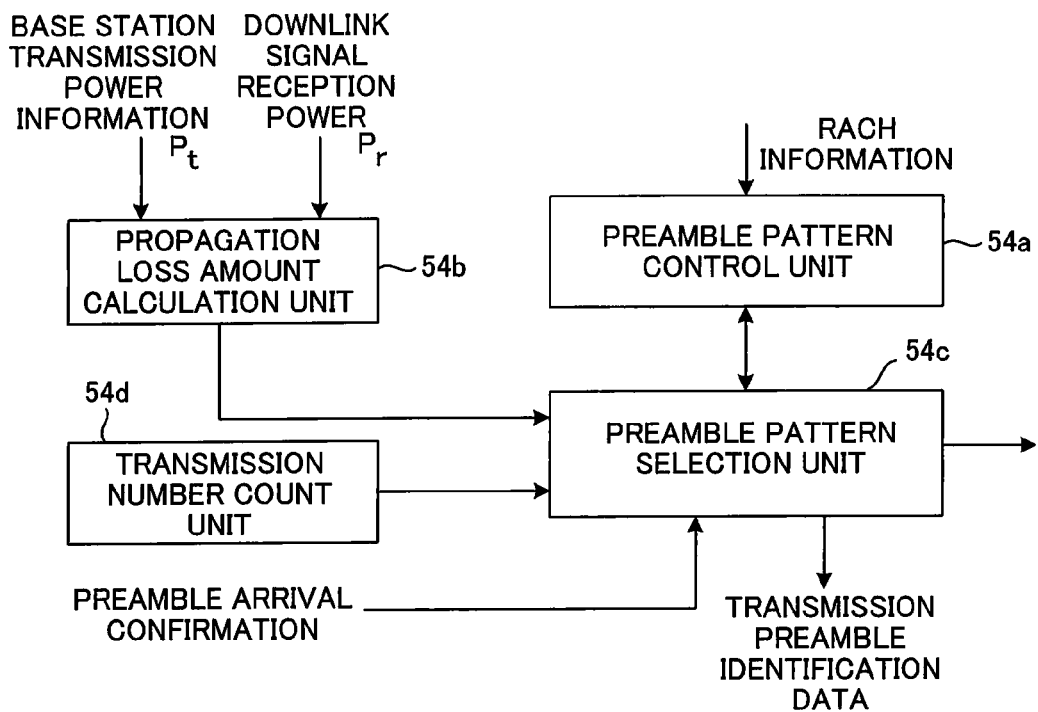
FIG. 8 is a drawing showing the construction of a RACH control unit in a user terminal.
Figure 9:
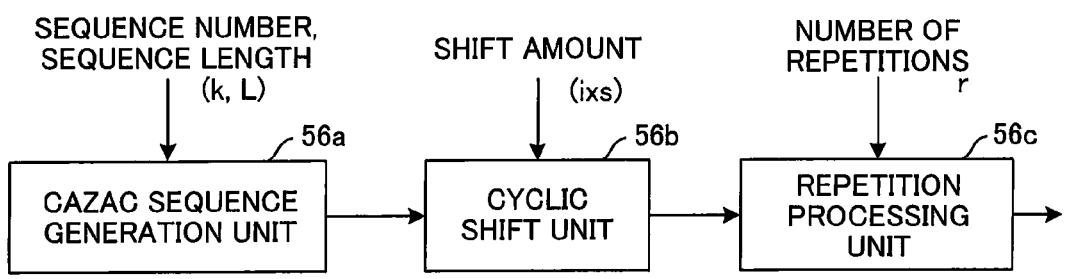
FIG. 9 is a drawing showing the construction of a preamble generation unit in a user terminal.

FIG. 7 is a drawing showing the construction of a user terminal (mobile station), FIG. 8 is a drawing showing the construction of a RACH control unit in the user terminal, and FIG. 9 is a drawing showing the construction of a preamble generation unit in the user terminal.

A radio transmission unit 51 receives a radio signal that is transmitted from a base station and converts that radio signal to a baseband signal, a separation unit (not shown in the figure) inputs RACH information, data/control signals and other information to a reception data processing unit 52, and inputs a pilot signal to a propagation path estimation unit 53. The reception data processing unit 52 performs channel compensation processing on the received signal based on a channel estimation value, after which it performs demodulation and decoding, and then outputs the decoded results. During initial communication, the reception data processing unit 52 inputs RACH information and base station transmission power information that were received from the base station to a RACH control unit 54, and inputs preamble reception confirmation information to a preamble arrival confirmation unit 55. The propagation path estimation unit 53 performs channel estimation based on the input pilot signal, as well as measures the downlink signal reception power, and inputs the results to the RACH control unit 54.

The RACH control unit has the construction shown in FIG. 8. A preamble pattern control unit 54a saves the preamble pattern information (see FIG. 5) that is included in the RACH information that is transmitted from the base station using a broadcast channel. The preamble pattern information specifies the number of repetitions 'r', the CAZAC sequence (sequence number 'k', sequence length 'L') and the cyclic shift amount 's' for each area of a cell as described above. A propagation loss amount calculation unit 54b saves the base station transmission power information Pt that is transmitted from the base station using a broadcast channel, and when the downlink signal reception power Pr is input from the propagation path estimation unit 53, calculates the propagation loss amount $P_{LOSS}$ from the equation $$P_{LOSS} = Pt - Pr \qquad (2)$$

and inputs the result to a preamble pattern selection unit 54c. The preamble pattern selection unit 54c determines the area where the user terminal exists based on the propagation loss amount $P_{LOSS}$. In other words, the larger the propagation loss amount $P_{LOSS}$ is, the greater the distance from the base station to the user terminal becomes, so the area where the user terminal exists can be determined from that propagation loss amount $P_{LOSS}$. More specifically, the preamble pattern selection unit 54c comprises a correspondence table for the propagation loss amount $P_{LOSS}$ and the area, and by referencing that table, determines the area where the user terminal exists.

Next, the preamble pattern selection unit 54c selects one preamble pattern that corresponds to the area where the user terminal exists, from among the plurality preamble patterns that are saved in the preamble pattern control unit 54a and together with inputting that preamble pattern to the preamble generation unit 56, inputs preamble identification data that identifies the transmitted preamble pattern to the preamble arrival confirmation unit 55. A transmission number count unit 54d counts and stores the number of times the preamble is transmitted, and when there is no preamble reception confirmation from the base station, the preamble pattern selection unit 54c instructs the preamble generation unit 56 to transmit the preamble to the base station within a specified period. When a preamble reception confirmation arrives from the base station, or when there is no preamble reception confirmation from the base station even though the number of times transmission has been performed is equal to a set number of times, the preamble pattern selection unit 54c stops transmission of the preamble.

When the parameters k, L, i×s and r that specify the preamble pattern P(k, L, i×s, r) are input from the RACH control unit 54, the preamble generation unit 56 generates repeatedly a preamble pattern, which is obtained by cyclically shifting a CAZAC sequence having a sequence number k and sequence length L an amount of i×s, r times, and transmits that preamble to the base station via the radio transmission unit 51. In other words, a CAZAC sequence generation unit 56a generates a CAZAC sequence $ZC_k(n)$ having a sequence length L, a cyclic shift unit 56b shifts the CAZAC sequence $ZC_k(n)$ an amount i×s to generate a cyclically shifted preamble pattern $ZC_k(n-i×s)$, and a repetition processing unit 56c repeats that preamble pattern $ZC_k(n-i×s)$ r times and inputs the result to the radio transmission unit 51.

The preamble transmission confirmation unit 55 compares the preamble identification data that is included in the preamble reception confirmation information that was received from the base station with the transmitted preamble identification data, and when there is a match, determines that the transmitted preamble has arrived at the base station and notifies a channel selection unit 57. The channel selection unit 57 immediately inputs a preamble transmission confirmation signal to the preamble pattern selection unit 54c of the RACH control unit 54 and to a data channel processing unit 58. After receiving the preamble transmission confirmation signal, the preamble pattern selection unit 54c immediately stops transmission of the preamble pattern, and the data channel processing unit 58 transmits the terminal number, data type, data amount and the like to the base station in order to establish a radio communication link.

Figure 10:
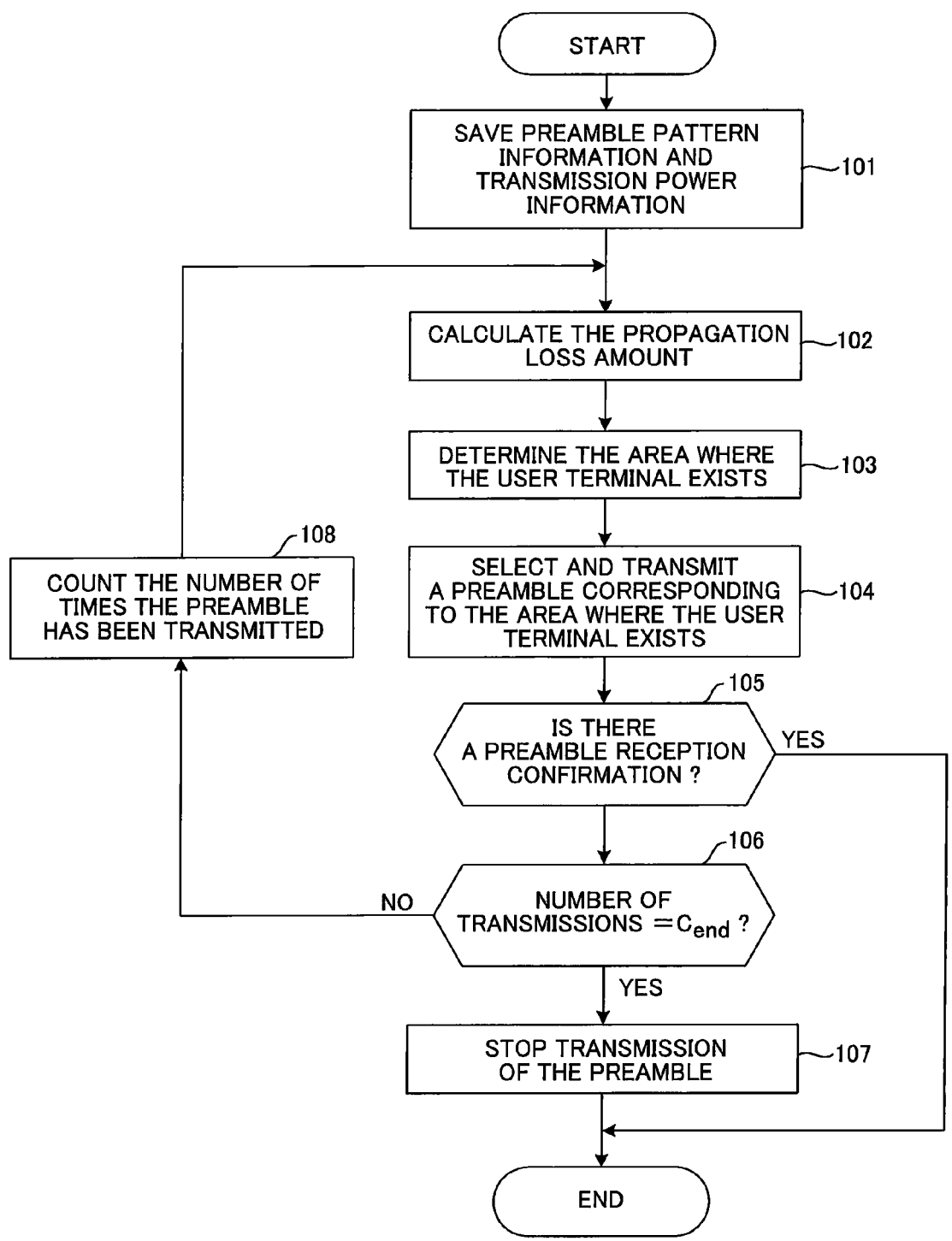
FIG. 10 is a flowchart showing the processing by the RACH control unit.

FIG. 10 is a flowchart of the processing by the RACH control unit 54.

The RACH control unit 54 saves the preamble pattern information and transmission power information Pt that is included in the RACH information that is transmitted from the base station using a broadcast channel (step 101), then using Equation (2), calculates the propagation loss amount $P_{LOSS}$ (step 102) and determines the area where the user terminal exists based on that propagation loss amount $P_{LOSS}$ (step 103). After determination of the area where the user terminal exists, the RACH control unit 54 selects one preamble pattern from the plurality of preamble patterns corresponding to that area and inputs it to the preamble generation unit 56, which generates and transmits the preamble to the base station (step 104). After that, the RACH control unit 54 checks whether preamble reception confirmation information has been sent from the base station (step 105), and when preamble reception confirmation information has been sent and received, ends transmission of the preamble.

However, when preamble reception confirmation information has not been sent and received even after waiting a specified amount of time, the RACH control unit 54 checks whether number of times C that transmission has been performed has reached a preset number of times Cend (step 106), and when C=Cend, stops transmission of the preamble (step 107), and ends the preamble transmission process. On the other hand, in step 106, when the number of times that transmission of the preamble has been performed has not yet reached the preset number of times (Cend>C), the RACH control unit 54 increases the count of the number of times that the preamble has been transmitted (C+1→C, step 108) and repeats processing from step 102.

Figure 11:
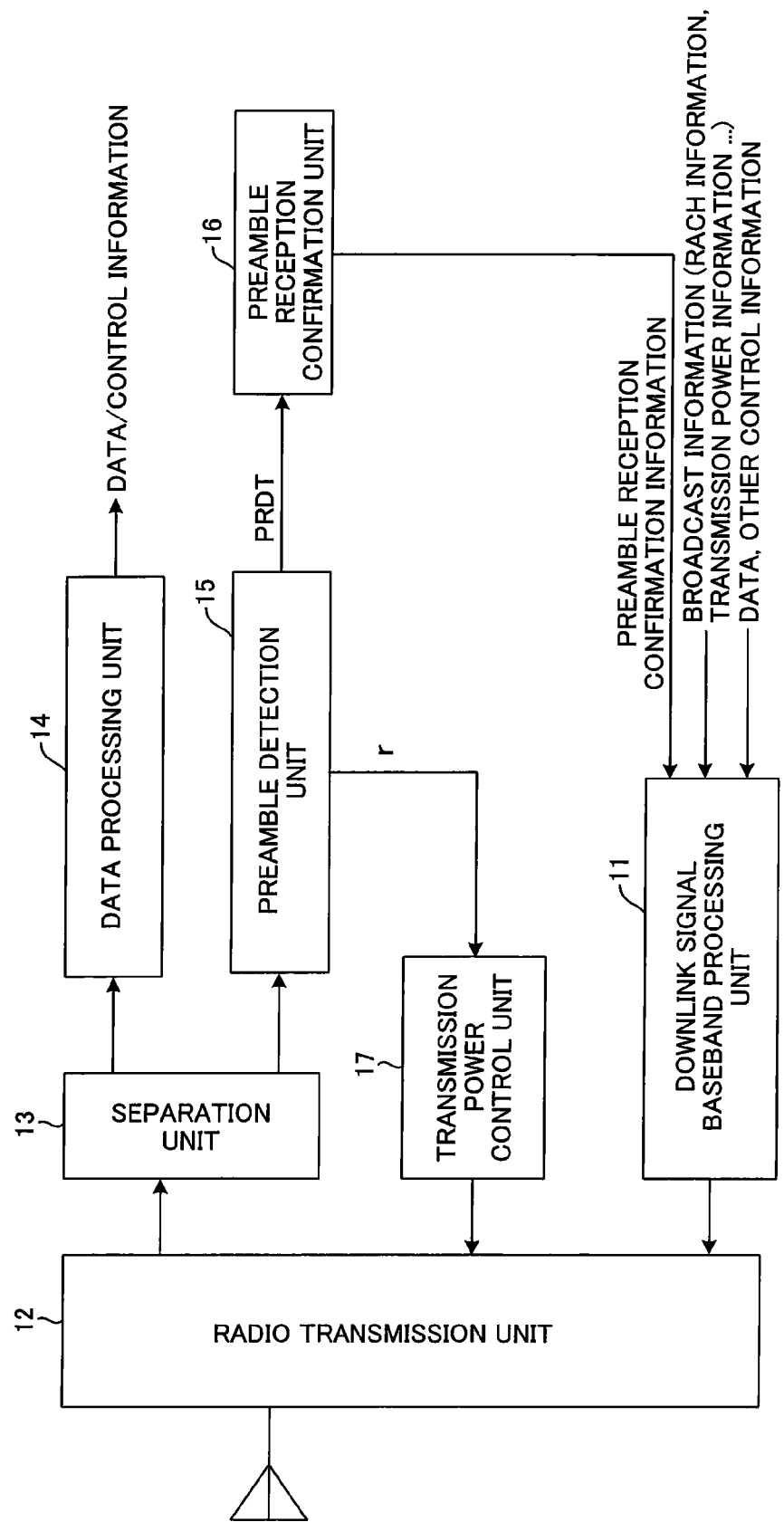
FIG. 11 is another drawing showing the construction of a base station.

FIG. 11 is a drawing showing different construction of the base station, where the same reference numbers are used for parts that are the same as those of the base station shown in FIG. 4. This base station differs in that it comprises a transmission power control unit 17 that controls the transmission power to a user terminal. The state of the propagation path to a user terminal can be estimated based on the number of repetitions 'r' of the preamble pattern. In other words, when r=0, the user terminal exists in an area that is near the base station, so it can be estimated that the state of the propagation path between that user terminal and the base station is good, and when r=2, the user terminal exists in an area that is far from the base station, so it can be estimated that the state of the propagation path between that user terminal and the base station is poor, and when r=1, it can be estimated that the state of the propagation path is normal. Therefore, when a preamble pattern is received from a specified user terminal, the transmission power control unit 17 of the base station determines the power for future transmission to that user terminal based on the number of repetitions 'r' of that preamble pattern. That is, when the number of repetitions 'r' is small, the transmission power can be set small, and when the number of repetitions 'r' is large, the transmission power can be set to be large. In this way, the transmission power can easily be controlled.

With this first embodiment of the invention, an area is divided into a plurality of areas, and the number of repetitions of the preamble patterns used in each area is controlled, so it is possible to reduce the processing burden on the base station even in the case of a large cell. Moreover, with this embodiment of the invention, the cyclic shift interval can be made small in an area near the base station, so even in the case of a large cell, a large number of usable sequences can be taken out from a primary sequence having little mutual interference. Furthermore, with this first embodiment, a preamble pattern of a sequence having a small PAPR is assigned to a user terminal existing at the edge of a cell, so it is possible to prevent non-linear distortion of signals that are outputted from the transmission amplifier of that user terminal, as well as it is possible to improve the efficiency of the amplifier.

(C) Second Embodiment

In the first embodiment, when a preamble that was transmitted from a user terminal could not be received by the base station, the user terminal transmitted the same preamble pattern the number of repetitions 'r'. In this second embodiment of the invention, when a preamble pattern cannot be received by the base station after being continuously transmitted a specified number of times, the user terminal increases the number of repetitions 'r' and repeatedly transmits the preamble pattern, whose number of repetitions has been increased, r number of times. By increasing the number of repetitions r in this way, the probability of the base station detecting the preamble can be increased.

Figure 12:
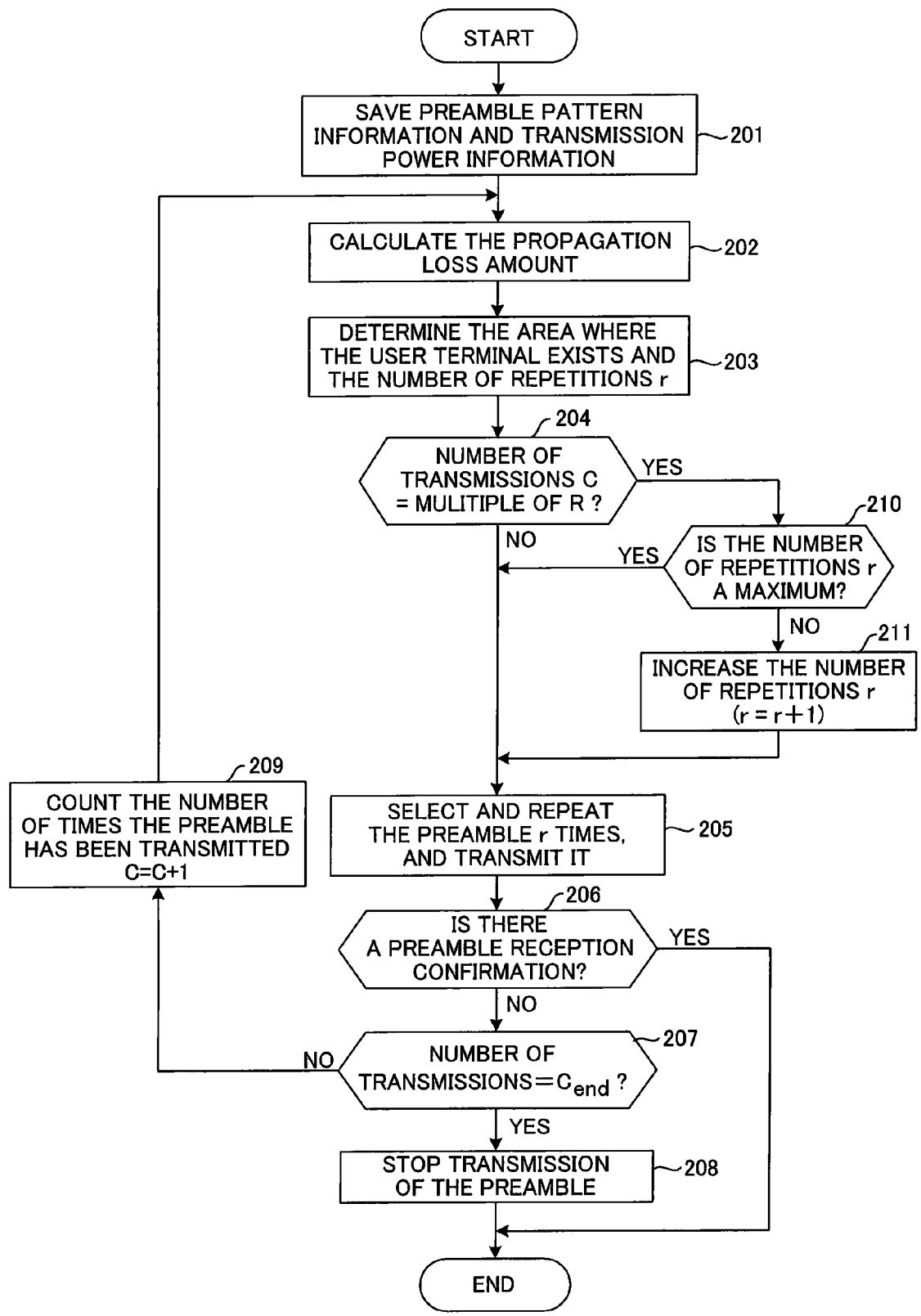
FIG. 12 is a flowchart showing the processing by the RACH control unit in a user terminal of a second embodiment of the invention.

FIG. 12 is a flowchart showing the processing by the RACH control unit in a user terminal of a second embodiment of the invention. The construction of the user terminal, RACH control unit 54 and preamble generation unit 56 is the same as that of the first embodiment. When reception of a preamble that has been continuously repeated R times fails, the number of repetitions r is increased by 1.

The RACH control unit 54 saves the preamble pattern information and transmission power information Pt that is included in the RACH information that is sent from the base station using a broadcast channel (step 201), then using Equation (2), calculates the propagation loss amount $P_{LOSS}$ (step 202), and determines the area where the user terminal exists based on that propagation loss amount $P_{LOSS}$ and the number of repetitions 'r' (step 203). After determination of the area where the user terminal exists, the RACH control unit 54 checks whether the number of times C that transmission has been performed has reached a multiple of R (step 204), and when the number of time C that transmission has been performed is not a multiple of R, the RACH control unit 54 selects one preamble pattern from among the plurality of preamble patterns that correspond to the area determined in step 203 and inputs that preamble pattern to the preamble generation unit 56, then the preamble generation unit 56 generates and transmits the preamble to the base station (step 205). After that, the RACH control unit 54 checks whether preamble reception confirmation information has been sent and received from the base station (step 206), and when preamble reception confirmation information has been sent and received, ends transmission of the preamble.

However, when preamble reception confirmation information has not been sent and received even after waiting a specified amount of time, the RACH control unit 54 checks whether the number of times C that transmission has been performed has reached a preset number of times Cend (step 207), and when C=Cend, stops transmission of the preamble (step 208), and ends processing for transmitting the preamble. On the other hand, in step 207, when the number of times C that preamble transmission has been performed has not yet reached the set number of times Cend (Cend>C), the count of the number of times C that preamble transmission has been performed is increased by 1 (C+1→C), step 209) and processing is repeated from step 202.

In step 204, when the number of times C that transmission has been performed has reached a multiple of R, the RACH control unit 54 checks whether the number of repetitions r has reached a maximum value (step 210), and when the number of repetitions r has reached the maximum value (YES), performs processing starting from step 205, and when the number of repetitions r has not reached the maximum value, the RACH control unit 54 increases the number of repetitions r by 1 (step 211), after which it repeats processing starting from step 205.

In this second embodiment, when the user terminal increases only the number of repetitions r without changing the preamble pattern, the base station does not know that the user terminal has increased the number of repetitions r. Therefore, it is necessary for all of the correlators (see FIG. 6) of the preamble detection unit 15 to calculate the correlation for just the maximum number of repetitions, and add the calculation results to detect the peak. However, by using a preamble of an area for which the number of repetitions is larger by one when the number of times C that transmission has been performed reaches the multiple R, it is possible to keep the construction of the correlators of the preamble detection unit 15 the same as shown in FIG. 6.

With this second embodiment of the invention, when the base station fails to receive the preamble pattern R times continuously, by increasing the number of repetitions r, it is possible to increase the preamble detection probability of the base station.

(D) Third Embodiment

In the first embodiment, a cell is divided into three areas A to C as shown in FIG. 1 and FIG. 2, where a preamble pattern C(1) having format 1 is set as the preamble for area A, with the number of repetitions being 0; preamble pattern C(m) having format 2 is set as the preamble for area B, with the number of repetitions being 1; and preamble pattern C(n) having format 3 is set as the preamble for area C, with the number of repetitions being 2. Also, a user terminal transmits a preamble toward the base station only one time within a specified time T regardless of the number of repetitions r, and when no preamble reception confirmation information arrives from the base station during that time, the user terminal resends the preamble.

Figure 13:
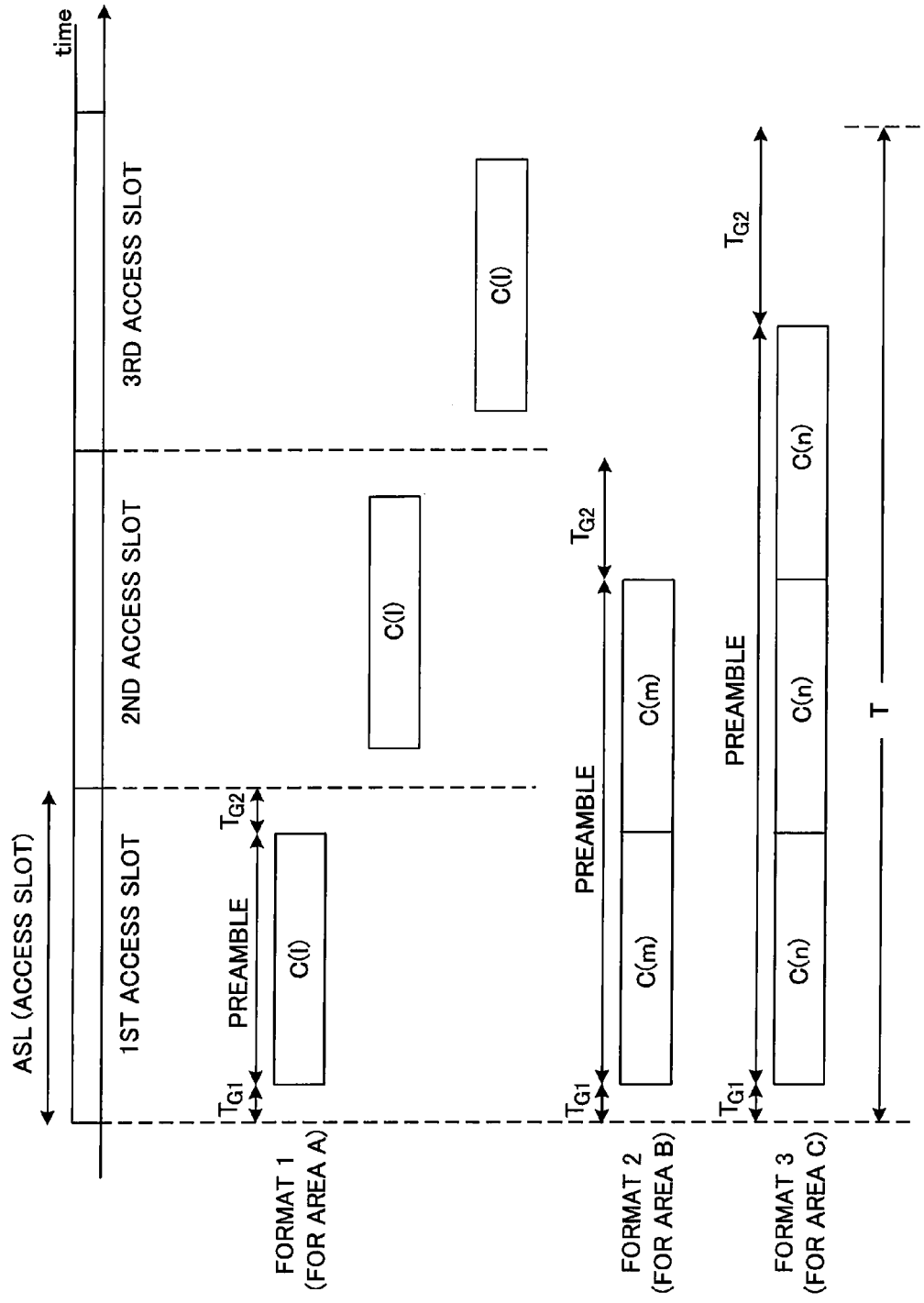
FIG. 13 is a drawing showing an overview of a third embodiment of the invention.

FIG. 13 is a drawing giving an overview of a third embodiment of the invention. In this third embodiment, a plurality of access slots are provided within a specified time T and at each of the access slots it is possible to transmit a preamble having a small number of repetitions, for example a repetition number r=0. The figure shows an example of the case in which preambles C(1) having a number of repetitions r=0 are transmitted in a first, second and third access slot ASL. By increasing the chances to transmit a preamble having a small number of repetitions in this way, the possibility of the same preamble being transmitted simultaneously from a plurality of user terminal can be reduced, and thus it is possible to reduce interference.

Figure 14:
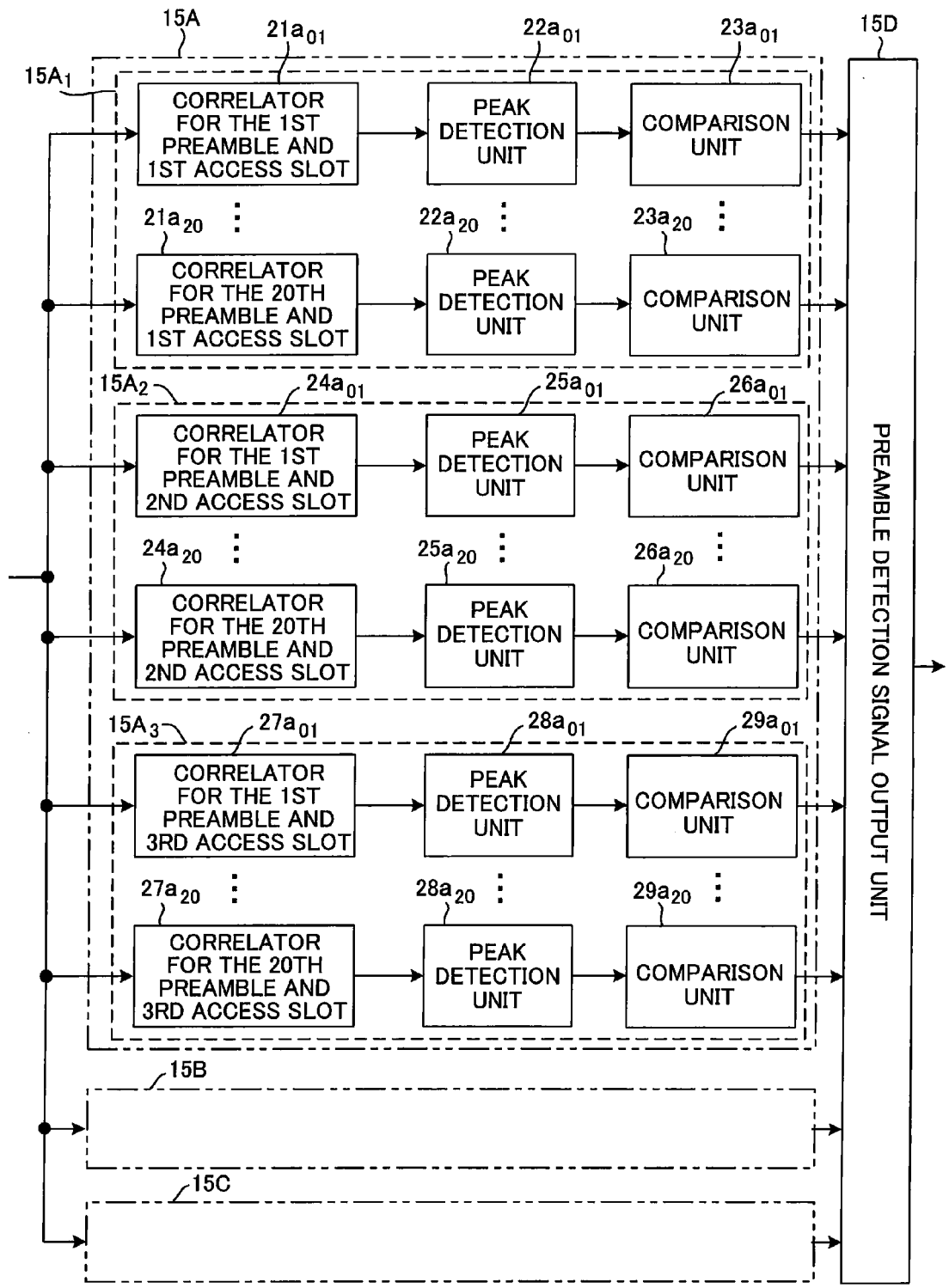
FIG. 14 is a drawing showing the construction of a preamble detection unit in the base station of a third embodiment of the invention.

FIG. 14 shows the construction of the preamble detection unit 15 (see FIG. 4) of the base station, and shows in detail the construction of only the first preamble detection unit 15A for a repetition number of 0, and details of the second preamble detection unit 15B for a repetition number of 1 and the third preamble detection unit 15C for a repetition number of 2 are omitted. The second and third preamble detection units 15B and 15C have the same construction of that shown in FIG. 6.

The first preamble detection unit 15A for a repetition number of 0 comprises: a first preamble unit $15A_1$ that performs preamble detection processing in a first access slot, a second preamble unit $15A_2$ that performs preamble detection processing in a second access slot, and a third preamble unit $15A_3$ that performs preamble detection processing in a third access slot.

The first preamble unit $15A_1$ comprises: correlators $21a_{01}$ to $21a_{20}$ that perform a correlation operation for computing the correlation between a received preamble signal and preamble patterns C(1) to C(20) having a repetition number r=0 for the first access slot; peak detection units $22a_{01}$ to $22a_{20}$ that detect the peak of the output from each of the correlators; and comparison units $23a_{01}$ to $23a_{20}$ that compare and determine whether or not each of the detected peak values is equal to or greater than a set value TH, and outputs the comparison results.

The second preamble unit $15A_2$ comprises: correlators $24a_{01}$ to $24a_{20}$ that perform a correlation operation for computing the correlation between a received preamble signal and preamble patterns C(1) to C(20) having a repetition number r=0 for the second access slot; peak detection units $25a_{01}$ to $25a_{20}$ that detect the peak of the output from each of the correlators; and comparison units $26a_{01}$ to $26a_{20}$ that compare and determine whether or not each of the detected peak values is equal to or greater than a set value TH, and outputs the comparison results.

The third preamble unit $15A_3$ comprises: correlators $27a_{01}$ to $27a_{20}$ that perform a correlation operation for computing the correlation between a received preamble signal and preamble patterns C(1) to C(20) having a repetition number r=0 for the third access slot; peak detection units $28a_{01}$ to $28a_{20}$ that detect the peak of the output from each of the correlators; and comparison units $29a_{01}$ to $29a_{20}$ that compare and determine whether or not each of the detected peak values is equal to or greater than a set value TH, and outputs the comparison results.

When the peak value of the output from a correlator of a preamble pattern C(i) (i=1 to 20) in the first to third access slots is equal to or greater than the set value TH, the preamble detection signal output unit 15D inputs a preamble detection signal having the access slot number and preamble pattern C(i) to the preamble reception confirmation unit 16 (see FIG. 4).

With this third embodiment, by increasing the chances for transmitting preambles having a small number of repetitions r, the possibility that the same preamble will simultaneously be transmitted from a plurality of user terminals can be reduced, and thus it is possible to reduce interference.

(E) Fourth Embodiment

In the first embodiment, preamble patterns are transmitted to the base station using the same frequency carrier even in the case where the number of repetitions r is 1 or greater. In this fourth embodiment, when the number of repetitions of the preamble pattern is 1 or greater, the transmission frequency of the preamble pattern that is sent first, second, . . . and so on is made to be different (hopping).

Figure 15:
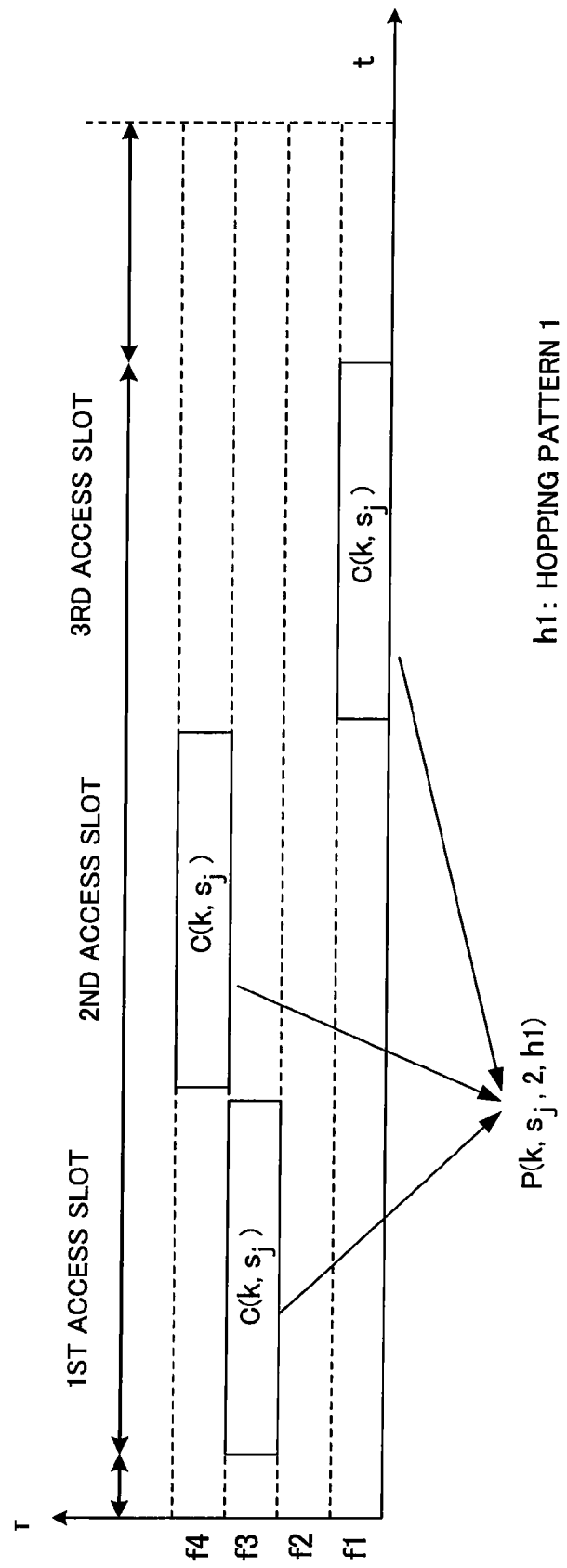
FIG. 15 is a drawing explaining a fourth embodiment of the invention.

FIG. 15 is a drawing explaining the fourth embodiment of the invention, where when transmitting a preamble pattern C(k,sj) having a number of repetitions r=2, the user terminal transmits a first preamble pattern C(k,sj) that is to be transmitted in the first access slot using a frequency f3, transmits a second preamble pattern C(k,sj) that is to be transmitted in the second access slot using a frequency f4, and transmits a third preamble pattern C(k,sj) that is to be transmitted in the third access slot using a frequency f1. In the case of this kind of frequency hopping, it is necessary to broadcast preamble information that includes hopping information h1 from the base station using a broadcast channel. In FIG. 15, the preamble information is P(k, sj, 2, h1) where h1=f3, f4, f1.

Figure 16:
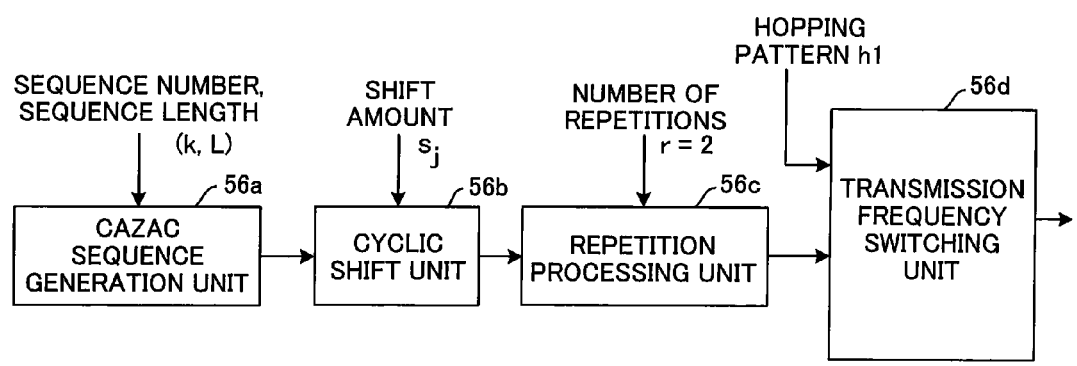
FIG. 16 is a drawing showing the construction of a preamble generation unit of a user terminal in a fourth embodiment of the invention.
Figure 17:
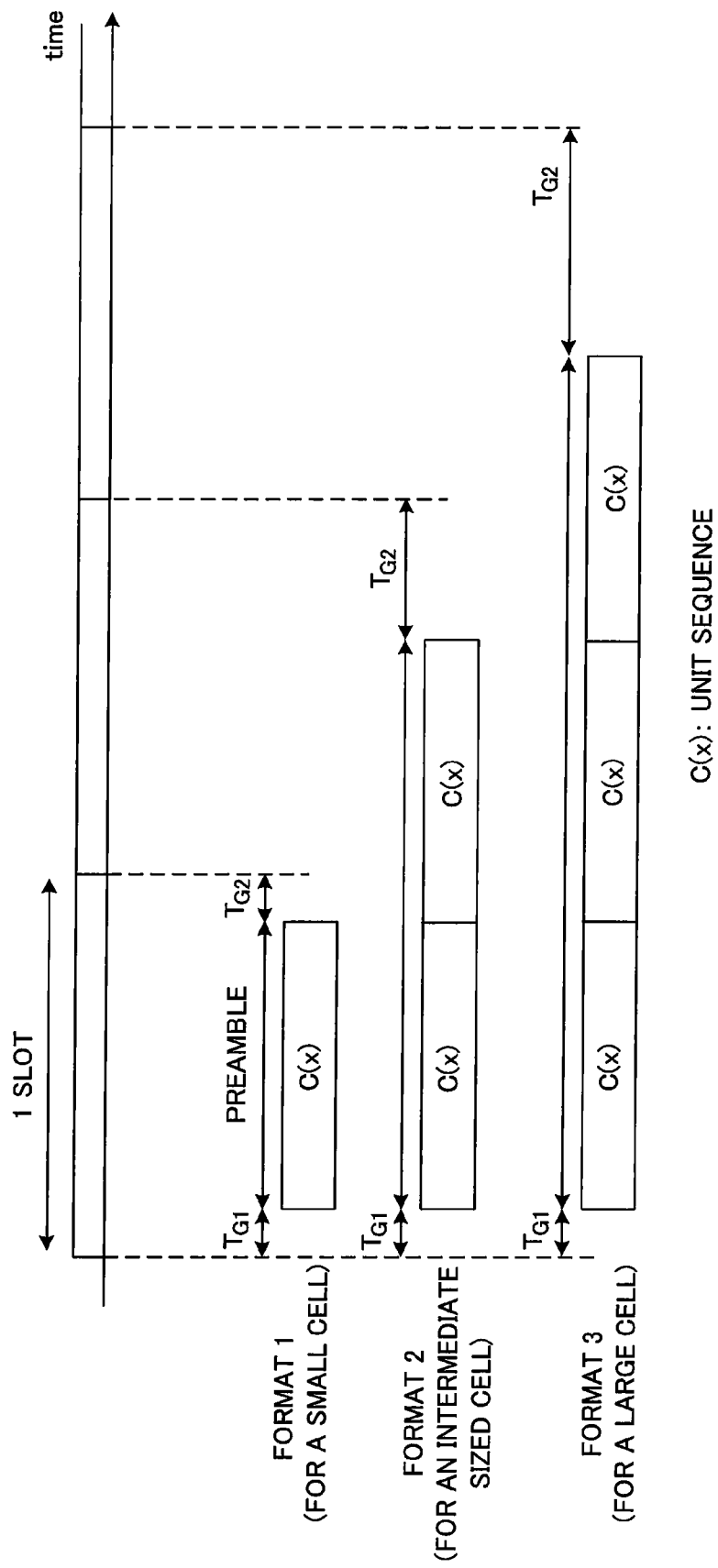
FIG. 17 is a drawing explaining related art in which the number of repetitions 'n' of a unit sequence C(x) of a preamble is changed based on the cell size.

FIG. 16 is a drawing showing the construction of the preamble generation unit 56 (see FIG. 7) of the user terminal, where the same reference numbers are used for parts that are the same as those of the first embodiment shown in FIG. 9. The preamble generation unit 56 differs in that a transmission frequency switching unit 56d is provided. Based on the hopping pattern h1, the transmission frequency switching unit 56d modulates the first preamble pattern C(k,sj) that is to be transmitted in the first access slot using frequency f3, modulates the second preamble pattern C(k,sj) that is to be transmitted in the second access slot using frequency f4, modulates the third preamble pattern C(k,sj) that is to be transmitted in the third access slot using frequency f1, and inputs the result to the radio transmission unit.

With this fourth embodiment, when using a preamble pattern having a number of repetitions of 1 or greater, by making the transmission frequency of the first preamble pattern to be transmitted different, the transmission frequency of the second preamble pattern to be transmitted different, . . . and so on, the preamble reception power increases due to the frequency diversity effect, and the preamble arrives for certain at the base station.

Advantages of The Invention

With the present invention described above, a cell is divided into a plurality of areas, and the number of repetitions of the preamble patterns in each area is controlled, so it is possible to reduce the processing load on the base station even in the case of a large cell.

With the present invention, the cyclic shift interval in areas near the base station can be made small, so it is possible to increase the number of sequences that can be taken out from a primary sequence having the same sequence number and little mutual interference even in large cells.

With the present invention, a preamble pattern of a sequence having a small PAPR is assigned to a user terminal existing at the edge of a cell, so it is possible to prevent non-linear distortion of signals that are outputted from the transmission amplifier of the user terminal, as well as improve the efficiency of the amplifier.

With the present invention, when the base station fails to receive a preamble pattern after R continuous times it is possible to improve the preamble detection probability by increasing the number of repetitions r.

With the present invention, by increasing the chances for transmitting a preamble pattern having a small number of repetitions, the possibility that the same preamble pattern will be simultaneously transmitted from a plurality of user terminals can be decreased and thus it is possible to reduce interference.

With the present invention, when using a preamble pattern having a number of repetitions of 1 or greater, by making the transmission frequency of the first preamble pattern to be transmitted different, the transmission frequency of the second preamble pattern to be transmitted different, . . . and so on, the preamble reception power increases due to the frequency diversity effect, and the preamble arrives for certain at the base station.

What is claimed is:

1. A random access channel transmission method, comprising:
   selecting a preamble pattern from among a plurality of known preamble patterns in a user terminal; and
   transmitting that preamble pattern to a base station from the user terminal,
   wherein a user terminal that exists in an area close to the base station repeats a first preamble pattern M number of times and transmits the preamble generated by the repetition, and a user terminal that exists in an area far from the base station repeats a second preamble pattern N (M<N) number of times and transmits the preamble generated by the repetition,
   wherein the base station sets said known preamble patterns for each area using CAZAC sequences, and a CAZAC sequence is used as a plurality of preamble patterns by changing the cyclic shift interval of the CAZAC sequence by each of a plurality of user terminals, and
   wherein the cyclic shift interval of a CAZAC sequence which is used in an area where the number of repetitions is small, is made to be narrow, and the cyclic shift interval of a CAZAC sequence which is used in an area where the number of repetitions is large, is made to be wide.

2. The random access channel transmission method of claim 1 wherein said M number of repetitions is '0'.

3. The random access channel transmission method of claim 1 wherein when the time necessary for transmitting a preamble pattern one time is taken to be 1 access slot, and the maximum number of repetitions is taken to be M, a user terminal that exists in an area where the number of repetitions is '0' transmits the selected preamble pattern to the base station in a specified access slot from among (M+1) number of access slots.

4. A random access channel transmission method, comprising:
   selecting a preamble pattern from among a plurality of known preamble patterns in a user terminal; and
   transmitting that preamble pattern to a base station from the user terminal,
   wherein a user terminal that exists in an area close to the base station repeats a first preamble pattern M number of times and transmits the preamble generated by the repetition, and a user terminal that exists in an area far from the base station repeats a second preamble pattern N (M<N) number of times and transmits the preamble generated by the repetition,
   wherein the base station sets said known preamble patterns for each area using CAZAC sequences, and a CAZAC sequence is used as a plurality of preamble patterns by changing the cyclic shift interval of the CAZAC sequence by each of a plurality of user terminals, and
   wherein the base station sets a CAZAC sequence having a small peak to average power ratio (PAPR) as the CAZAC sequence for an area where the number of repetitions is large.

5. A random access channel transmission method, comprising:
   selecting a preamble pattern from among a plurality of known preamble patterns in a user terminal; and
   transmitting that preamble pattern to a base station from the user terminal,
   wherein a user terminal that exists in an area close to the base station repeats a first preamble pattern M number of times and transmits the preamble generated by the repetition, and a user terminal that exists in an area far from the base station repeats a second preamble pattern N (M<N) number of times and transmits the preamble generated by the repetition, and
   wherein the base station broadcasts said known preamble patterns and the number of repetitions for each of said areas to user terminals using a broadcast channel.

6. The random access channel transmission method of claim 5 wherein
   the base station broadcasts the transmission power to the user terminals using the broadcast channel;
   each of the user terminals computes the difference between said transmission power and reception power, and based on that difference, identifies the area where the user terminal exists, selects a specified preamble pattern that is assigned to that area, and transmits the preamble pattern repeatedly a number of times that corresponds to said number of repetitions.

7. The random access channel transmission method of claim 6 wherein when the transmitted preamble pattern is not received by the base station, the user terminal increases the number of repetitions and continuously transmits said preamble pattern.

8. The random access channel transmission method of claim 6 wherein the base station calculates the correlation between the reception signal and each of said broadcasted preamble patterns, adds the correlation results said number of times for each preamble pattern, detects a preamble pattern having a correlation peak value that is equal to or greater than a set value, and notifies the user terminal that that preamble pattern was received.

9. The random access channel transmission method of claim 8 wherein when the base station transmits predetermined information to a user terminal, the base station transmits the information at a transmission power that corresponds to the number of repetitions of the preamble pattern that was received from the user terminal.

10. The random access channel transmission method of claim 5 wherein
    the base station broadcasts said known preamble patterns, said number of repetitions, and a hopping pattern for each of said areas to user terminals using a broadcast channel, and
    a user terminal that exists in an area where the number of repetitions is 1 or more changes the transmission frequency based on said hopping pattern and transmits the selected preamble pattern by the transmission frequency.

11. A base station of a radio communication system in which a user terminal selects one preamble pattern from among a plurality of known preamble patterns and transmits that preamble pattern to the base station, comprising:
    broadcast means for broadcasting to the user terminals, a plurality of preamble patterns and a number of repetitions for transmitting repeatedly each of the preamble patterns;
    preamble detection means for detecting a preamble pattern that is transmitted from a user terminal; and transmission means for creating and transmitting preamble reception confirmation information to the user terminal in a case where said preamble pattern is received, wherein said preamble detection means comprises:

a correlation unit that calculates the correlation between the received signal and each of said broadcasted preamble patterns;

an addition unit that adds for each preamble patterns, the correlation results a plurality of times that correspond to said number of repetitions for transmitting the preamble pattern; and a comparison unit that performs a comparison to determine whether the peak correlation value is equal to or greater than a set value for each preamble pattern, and when the peak correlation value is equal to or greater than the set value, determines that the preamble pattern that corresponds to that peak correlation value has been received.

12. The base station of claim 11 wherein the number of repetitions of the preamble pattern that is selected by a user terminal that exists in an area close to the base station is smaller than the number of repetitions of the preamble that is selected by a user terminal that exists in an area far from the base station.

13. The base station of claim 11, wherein said broadcast means specifies one or more CAZAC sequence as said preamble patterns and cyclic shift intervals for each CAZAC sequence, and said user terminal selects a CAZAC sequence and shifts the CAZAC sequence the specified cyclic shift interval amount to generate a preamble pattern.

14. The base station of claim 11, further comprising a transmission power control unit that, when the base station transmits predetermined information to a user terminal, determines the transmission power based on the number of repetitions of the preamble pattern received from that user terminal.

15. A radio communication system in which a user terminal selects one preamble pattern from among a plurality of known preamble patterns and transmits that preamble pattern to a base station, wherein the base station comprises:

broadcast means for dividing a cell into a plurality of areas, setting one or more preamble patterns for each area and the number of repetitions for transmitting repeatedly each of the preamble patterns, and broadcasting the set information to user terminals;

preamble detection means for detecting a preamble pattern that is transmitted from a user terminal; and transmission means for creating and transmitting preamble reception confirmation information to the user terminal when said preamble pattern is received; and the user terminal comprises:

a memory unit that saves broadcast information that is transmitted from the base station;

area detection means for detecting the area where that user terminal exists;

a preamble pattern selection unit that selects a preamble pattern that corresponds to the area from the broadcast information stored in said memory unit; and a preamble transmission unit that generates the preamble pattern and transmits the preamble pattern repeatedly the number of repetitions, wherein said area detection means comprises:

calculation means for calculating the difference between the transmission power that was broadcasted from the base station and the signal reception power of the user terminal; and detection means for identifying the area where the user terminal exists based on the calculated difference.

16. The radio communication system of claim 15, wherein said user terminal comprises:

receiving means for receiving the preamble reception confirmation information that is transmitted from the base station;

reception confirmation means for determining, based on the preamble reception confirmation information, whether the preamble pattern that was transmitted by that user terminal was received by the base station; and means for increasing the number of repetitions for transmitting the preamble pattern when the base station did not receive the transmitted preamble pattern; wherein said preamble transmission unit continuously transmits the preamble pattern the increased number of repetitions for transmission.

17. The radio communication system of claim 15, wherein when the time necessary for transmitting a preamble pattern one time is taken to be 1 access slot, and the maximum number of repetitions is taken to be M, said preamble transmission unit of a user terminal that exists in an area where the number of repetitions is '0' transmits the selected preamble pattern to the base station in a specified access slot from among (M+1) number of access slots.

18. The radio communication system of claim 15, wherein in addition to the preamble patterns for each said area, and the number of repetitions, said broadcast means of the base station broadcasts a hopping pattern to user terminals using a broadcast channel, and said preamble transmission unit of a user terminal that exists in an area where the number of repetitions is '1' or more transmits the selected preamble pattern by changing the transmission frequency based on said hopping pattern.

* * * * *